(12) United States Patent
Takai

(10) Patent No.: US 8,028,713 B2
(45) Date of Patent: Oct. 4, 2011

(54) UNDERGROUND WATER STORAGE TANK

(75) Inventor: Seiichiro Takai, Tokyo (JP)

(73) Assignee: Totetu Mfg. Co. Ltd., Tokyo (JP)

( * ) Notice: Subject to any disclaimer, the term of this patent is extended or adjusted under 35 U.S.C. 154(b) by 906 days.

(21) Appl. No.: 10/583,705

(22) PCT Filed: May 19, 2005

(86) PCT No.: PCT/JP2005/009164
§ 371 (c)(1),
(2), (4) Date: Apr. 20, 2007

(87) PCT Pub. No.: WO2006/001139
PCT Pub. Date: Jan. 5, 2006

(65) Prior Publication Data
US 2007/0267418 A1    Nov. 22, 2007

(30) Foreign Application Priority Data

Jun. 25, 2004 (JP) ................................. 2004-187740
Dec. 15, 2004 (JP) ................................. 2004-363336

(51) Int. Cl.
*E03B 11/04* (2006.01)
*F17D 1/13* (2006.01)
*B65D 88/76* (2006.01)
(52) U.S. Cl. ..... 137/236.1; 137/576; 405/45; 220/567.1
(58) Field of Classification Search .................. 137/264, 137/571, 573, 574, 576, 236.1; 220/567.1; 405/43, 45
See application file for complete search history.

(56) References Cited

U.S. PATENT DOCUMENTS

| | | | | |
|---|---|---|---|---|
| 4,372,340 A | * | 2/1983 | Rothrock | 137/576 |
| 5,624,204 A | * | 4/1997 | Dorsemaine | 405/52 |
| 6,382,237 B1 | * | 5/2002 | Takai | 137/236.1 |

FOREIGN PATENT DOCUMENTS

| | | |
|---|---|---|
| EP | 1146176 A1 * | 10/2001 |
| JP | 2000-213015 | 8/2000 |
| JP | 2000-309958 | 11/2000 |
| JP | 2001-098591 | 4/2001 |
| JP | 2001-107403 | 4/2001 |
| JP | 2002-115280 | 4/2002 |

* cited by examiner

*Primary Examiner* — John Rivell
*Assistant Examiner* — Atif Chaudry
(74) *Attorney, Agent, or Firm* — Jules E. Goldberg

(57) ABSTRACT

An underground water storage tank which rarely causes water leakage, and which largely increases an amount of water to be stored therein having an internal water storage sub-tank 11 provided by coating an assembly of water-bearing materials 12 obtained by combining multiple water-bearing materials 12 with one another with a first water-impermeable sheet 14; soil pressure absorption plates 26 provided outside the internal water storage sub-tank 11; and a second water-impermeable sheet 27 for coating the soil pressure absorption plates 26. The water-bearing materials are rigid pipes 12 made of resin and the assembly of the water-bearing materials is formed by mutually and parallel coupling the multiple rigid pipes 12 by pipe coupling means 13 in a state that the multiple rigid pipes 12 are vertically set and arranged at predetermined intervals therebetween in a horizontal direction.

6 Claims, 19 Drawing Sheets

UNDERGROUND WATER STORAGE TANK

TECHNICAL FIELD

The present invention relates to an underground water storage tank configured to be buried underground and to be capable of storing water therein.

BACKGROUND ART

As equipment for effectively utilizing rainwater, there has been conventionally known one in which a water storage tank capable of storing rainwater therein is buried underground. Such an underground water storage tank is configured to collect rainwater fallen onto roofs or rooftops of houses or a surface of the ground through rain pipes or ditches, and to conduct and store the collected rainwater into the interior of the tank. Such equipment is provided with drainage means such as a pump capable of extracting water stored in the equipment, from the ground surface, and is configured to cause the water stored within the equipment to be extracted by the drainage means to utilize the water.

Conventionally, there has been known a water storage tank to be used in such equipment and installed underground in a relatively simple manner, which tank is configured with stacked water-bearing materials comprising sand, gravel, broken stones, or the like. This water storage tank is formed by: excavating a place where the underground water storage tank is to be formed; arranging a sheet onto the lowermost portion at the center of the excavated place, and stacking up water-bearing materials comprising sand, gravel, broken stones, or the like at the central portion of the sheet; thereafter, raising up the periphery of the sheet to thereby surround the periphery of the water-bearing materials; and placing the ends of the sheet onto upper surfaces of the water-bearing materials. This underground water storage tank is configured to store water in gaps between the water-bearing materials comprising sand, gravel, broken stones, or the like.

However, the above-mentioned underground water storage tank exhibits a problem that the amount of stored rainwater or the like is relatively small because of a relatively large amount of the water-bearing materials comprising sand, gravel, broken stones, or the like in the space enclosed by the sheet. To solve this problem, it has been proposed to form water-bearing materials by molded bodies of plastics formed by molds, respectively (see patent-related reference 1, for example). In case of the water-bearing materials comprising the molded bodies of plastics, usage thereof allows for decrease of an occupying ratio of the water-bearing materials in terms of a volume enclosed by a sheet to thereby increase an amount of stored rainwater.

Patent-related reference 1: JP-B-4-35580 (Claims)

DISCLOSURE OF THE INVENTION

Problem to be Solved by the Invention

However, in the conventional underground water storage tanks, soil pressures from the surroundings are directly applied onto the sheet for coating an aggregation of water-bearing materials because the tanks are each buried underground, such that sharp stones or the like existing in the surrounding ground contact with the sheet to break the same to thereby problematically cause water leakage. Further, in case of the water-bearing materials comprising the molded bodies of plastics, there is caused a limitation on the height to which the water-bearing materials are stacked up, thereby problematically making it impossible to increase the amount of stored rainwater in the underground water storage tank up to an expected level. Moreover, in case of the underground water storage tanks to be buried underground, since it is difficult to perform interior washing and maintenance, it is desirable to store relatively clean water in the tanks so as to avoid a situation as much as possible where the interiors thereof are contaminated.

It is therefore a first object of the present invention to provide an underground water storage tank by which water leakage is rarely caused.

It is a second object of the present invention to provide an underground water storage tank which is capable of remarkably increasing an amount of water to be stored therein.

It is a third object of the present invention to provide an underground water storage tank capable of storing relatively clean water therein.

Means for Solving the Problem

According to an embodiment of the invention, the invention resides in an underground water storage tank 10 configured to be buried underground and to be capable of storing water therein, as shown in FIG. 1.

The characterizing configuration resides in that the underground water storage tank comprises:

an internal water storage sub-tank 11 provided by coating an assembly of water-bearing materials 12 obtained by combining multiple water-bearing materials 12 with one another with a first water-impermeable sheet 14;

soil pressure absorption plates 26 provided outside the internal water storage sub-tank 11; and a second water-impermeable sheet 27 for coating the soil pressure absorption plates 26.

The soil pressure absorption plates 26 are provided outside the internal water storage sub-tank 11 and the soil pressure absorption plates 26 are coated with the second water-impermeable sheet 27, so that soil pressures from the surroundings are applied to the second water-impermeable sheet 27 and absorbed by the soil pressure absorption plates 26, thereby allowing prevention of direct application of the soil pressures to the first water-impermeable sheet 14. This enables avoidance of breakage of the first water-impermeable sheet 14 even when the second water-impermeable sheet 27 is broken by the soil pressures, thereby effectively enabling prevention of leakage of the water stored in the internal water storage sub-tank to the exterior.

The invention resides in the underground water storage tank as shown in FIG. 2, wherein the water-bearing materials are rigid pipes 12 made of resin, respectively; and wherein the assembly of the water-bearing materials is formed by mutually and parallelizingly coupling the multiple rigid pipes 12 by pipe coupling means 13 in a state that the multiple rigid pipes 12 are vertically set and arranged at predetermined intervals therebetween in a horizontal direction.

In the underground water storage tank recited in claim 2, adopting the rigid pipes 12 as the water-bearing materials enables a decreased ratio of the water-bearing materials 12 occupying the interior space of the internal water storage sub-tank 11 as compared with water-bearing materials comprising sand, gravel, broken stones, or the like, thereby enabling an increased amount of rainwater to be stored. Further, when the rigid pipes 12 are made by working those pipes which are prepared in a large number by extrusion forming and which are thus relatively inexpensive, it becomes possible to avoid an increased unit cost of the underground water storage tank 10. Moreover, the rigid pipes 12 are arranged at predetermined intervals therebetween in a horizontal direction and are mutually coupled by the coupling means 13, thereby enabling the number of used rigid pipes 12 to be decreased to avoid that the unit cost is increased due to the increased number of used rigid pipes.

The invention resides in the underground water storage tank as shown in FIG. 1, further comprising rod-like steel materials 23 vertically piled underground;

wherein applicable ones of the rigid pipes 12 are fitted on and affixed to the rod-like steel materials 23, respectively, so that the assembly of the water-bearing materials is fixed to the rod-like steel materials 23.

According to the underground water storage tank, the assembly of the water-bearing materials is fixed to the rod-like steel materials piled underground, thereby avoiding collapse of the assembly. This enables a relatively large number of rigid pipes 12 as water-bearing materials to be assembled, thereby enabling an increased amount of rainwater to be stored in the underground water storage tank 10.

The invention resides in the underground water storage tank of wherein the internal water storage sub-tank 11 comprises multiple internal water storage sub-tanks 11 provided in a horizontal direction with inter-tank cushioning materials 24 interposed therebetween, respectively; and wherein the second water-impermeable sheet 27 is continuously established to coat the multiple internal water storage sub-tanks 11.

According to the underground water storage tank, the internal water storage sub-tanks 11 are plurally provided, thereby enabling an increased amount of rainwater to be stored in the internal water storage sub-tanks 11. Further, the inter-tank cushioning materials 24 are interposed between the internal water storage sub-tanks 11, respectively, thereby allowing prevention of breakage of the first water-impermeable sheet 14 constituting the internal water storage sub-tanks 11, and thereby enabling inhibition of leakage of water stored in one internal water storage sub-tank 11 even when the first water-impermeable sheet 14 is broken at another internal water storage sub-tank 11, to enable avoidance of such a situation that the stored water is fully leaked out.

The invention resides in the underground water storage tank wherein an outer water storage compartment 29 including the soil pressure absorption plates 26 is defined between the first water-impermeable sheet 14 and the second water-impermeable sheet 27;

wherein one or two or more first intake pipes 28, each having one end communicated to the internal water storage sub-tank 11 and the other end opened into the outer water storage compartment 29, are provided to penetrate through the first water-impermeable sheet 14; and wherein the or each first intake pipe 28 is provided with a first non-return valve 31 configured to: allow water to flow from the outer water storage compartment 29 into the interior of the or each internal water storage sub-tank 11, when a water pressure of the outer water storage compartment 29 is equal to or higher than a water pressure within the or each internal water storage sub-tank 11; and prevent water from flowing from the interior of the or each internal water storage sub-tank 11 into the outer water storage compartment 29, when a water pressure of the outer water storage compartment 29 is below a water pressure within the or each internal water storage sub-tank 11.

According to the underground water storage tank, water is conducted to the outer water storage compartment 29 to thereby allow the water to be conducted into the multiple internal storage sub-tanks 11 via first non-return valve 31 and first intake pipe 28 and stored in the or each sub-tank.

The invention resides in the underground water storage tank as shown in FIG. 16, further comprising multiple vertical pipes 71, and coupling pipes 72 for coupling the vertical pipes 71 to one another, the vertical pipes 71 and the coupling pipes 72 being embedded in the soil pressure absorption plates 26;

wherein the or each first intake pipe 28 is provided through the first water-impermeable sheet 14 so that the other end of the or each first intake pipe 28 is opened into the interior of applicable one of the vertical pipes 71; and wherein the first non-return valve 31 is provided at the other end of the or each first intake pipe 28 inside the applicable vertical pipe 71.

According to the underground water storage tank, it is possible to assuredly store water in the outer water storage compartment 29 by conducting water into the interiors of the vertical pipes 71 and coupling pipes 72.

The invention resides in the underground water storage tank as shown in FIG. 10, further comprising:

one or two or more second intake pipes 51 each having one end set to penetrate through the second water-impermeable sheet 27 and communicated with the outer water storage compartment 29, and the other end opened underground around the outer periphery of the second water-impermeable sheet 27;

a second non-return valve 52 provided at one end or other end of the or each second intake pipe 51, and configured to: allow water to flow from the other end of the or each second intake pipe 51 to one end thereof, when a water pressure at the other end of the or each second intake pipe 51 is equal to or higher than a water pressure at the one end of the or each second intake pipe 51; and prevent water from flowing from the one end of the or each second intake pipe 51 to the other end thereof, when a water pressure at the other end of the or each second intake pipe 51 is below a water pressure at the one end of the or each second intake pipe 51; and a perforated tube 53 formed with a plurality of water-permeable holes 53a over a periphery thereof, and buried in a manner to have one end connected to the other end of the or each second intake pipe 51 or to the second non-return valve 52, and the other end to be located above the second non-return valve 52.

According to the underground water storage tank, rainwater, which has fallen over a relatively wide area and permeated underground and has been filtered clean, is collected by the perforated tube 53 and conducted to the second intake pipe 51, and the rainwater is allowed to be taken from the second intake pipe 51 into the underground water storage tank 10, thereby enabling rainwater fallen over a relatively wide area to be effectively collected and stored.

The invention resides in an improvement of an underground water storage tank 110 configured to be buried underground and to be capable of storing water therein, as shown in FIG. 18.

The characterizing configuration resides in that the underground water storage tank comprises:

an internal water storage sub-tank 111 comprising first water-bearing materials 112 coated with a first water-impermeable sheet 114;

an outer water storage compartment 119 defined between the first water-impermeable sheet 114 provided around the internal water storage sub-tank 111 and a second water-impermeable sheet 118, and provided by coating second water-bearing materials 117 disposed around the internal water storage sub-tank 111 with the second water-impermeable sheet 118;

one or two or more intake pipes 121 each provided to penetrate through the first water-impermeable sheet 114 and to have one end communicated to the internal water storage sub-tank 111 and the other end opened into the outer water storage compartment 119;

a non-return valve 122 provided at the or each intake pipe 121 and configured to: allow water to flow from the outer water storage compartment 119 into the interior of the internal water storage sub-tank 111, when a water level of the outer water storage compartment 119 is equal to or higher than a water level inside the internal water storage sub-tank 111; and prevent water from flowing from the interior of the internal water storage sub-tank 111 into the outer water storage compartment 119, when a water level of the outer water storage compartment 119 is below a water level inside the internal water storage sub-tank 111; and a water supply pipe 127 for supplying water into the outer water storage compartment 119, which water is to be stored into the internal water storage sub-tank 111 through the non-return valve 122 and the or each intake pipe 121.

According to the underground water storage tank, the internal water storage sub-tank 111 obtained by coating the first water-bearing materials 112 with the first water-impermeable sheet 114 is further coated with the second water-impermeable sheet 118, so that the soil pressures from the surroundings are applied to the second water-impermeable sheet 118 to thereby prevent direct application of the soil pressures to the first water-impermeable sheet 114. Thus, even when the second water-impermeable sheet 118 is broken due to soil pressures, it is possible to avoid breakage of the first water-impermeable sheet 114, thereby effectively enabling avoidance of leakage of water stored in the internal water storage sub-tank 111 to the exterior. Further, water to be stored in the internal water storage sub-tank 111 is once supplied into the outer water storage compartment 119 via the water supply pipe 127 and flows therefrom into the internal water storage sub-tank 111 via non-return valve 122 and intake pipe 121, thereby effectively preventing a situation that the water inside the internal water storage sub-tank 111 coated with the first water-impermeable sheet 114 is leaked to the exterior even when the second water-impermeable sheet 118 is broken and the water in the outer water storage compartment 119 is leaked out.

The invention resides in the underground water storage tank, wherein the internal water storage sub-tank 111 comprises multiple internal water storage sub-tanks 111 arranged in a horizontal direction with second water-bearing materials 117 interposed therebetween; and wherein the second water-impermeable sheet 118 is continuously established to coat the multiple internal water storage sub-tanks 111.

According to the underground water storage tank, the internal water storage sub-tanks 111 are plurally provided, thereby enabling an increased amount of rainwater to be stored in the underground water storage tank 110 while providing each internal water storage sub-tank 111 in a scale which is easily constructed without increasing it into an enormous scale. Furthermore, the multiple internal water storage sub-tanks 111 are made independent, thereby enabling inhibition of leakage of water stored in one internal water storage sub-tank 111 even when the first water-impermeable sheet 114 is broken at another internal water storage sub-tank 111, thereby enabling avoidance of such a situation that the stored water is fully leaked out.

The invention resides in the underground water storage tank, wherein the second water-bearing materials 117 each comprises an expanded resin plate material having a surface formed with a plurality of water flow grooves 117a.

According to the underground water storage tank, the soil pressures applied from the surroundings to the second water-impermeable sheet 118 are effectively absorbed by the second water-bearing materials 117 comprising expanded resin plate materials, thereby effectively preventing a situation that the soil pressures are applied to the first water-impermeable sheet 114 to break the internal water storage sub-tanks 111.

Further, since the second water-bearing materials 117 have surfaces formed with multiple grooves 117a for water flow therethrough, the water-bearing ratio taken at the outer water storage compartment 119 defined between the first water-impermeable sheet 114 and the second water-impermeable sheet 118 by the coating of the second water-bearing materials 117, is a ratio taken by the multiple grooves 117a in the second water-bearing materials 117. As such, the water-bearing ratio itself can be decreased by decreasing the number of grooves 117a or decreasing the cross-sectional areas thereof, such that the decreased water-bearing ratio allows the water level in the outer water storage compartment 119 to be rapidly raised when water flows into the outer water storage compartment 119 from the exterior, thereby enabling the water supplied into the outer water storage compartment 119 to be rapidly delivered into the internal water storage sub-tanks 111.

Further, even when small holes are happened to be formed in the second water-impermeable sheet 118, water to be leaked from the holes to the exterior is limited to a small amount, insofar as the water-bearing ratio at the outer water storage compartment 119 is made small. On the other hand, in a case that the amount of water to be supplied per unit time from the water supply pipe 127 to the outer water storage compartment 119 is larger than the amount of water to be leaked from such small holes to the exterior, most of the water supplied to the outer water storage compartment 119 is conducted through the non-return valves 122 and intake pipes 121 into the internal water storage sub-tanks 111 and stored therein, thereby allowing avoidance of a situation that the function of the underground water storage tank 110 is considerably lost.

The invention resides in the underground water storage tank, wherein the water supply pipe 127 is provided at a lower portion of the outer water storage compartment 119 such that the one end of the water supply pipes 127 is located lower than the other end thereof;

wherein the one end of the water supply pipe 127 is connected to a management liquid measure 128 provided outside the second water-impermeable sheet 118; and wherein the management liquid measure 128 is configured so that water supplied to the management liquid measure 128 is supplied into the outer water storage compartment 119 from the management liquid measure 128 through the water supply pipe 127.

According to the underground water storage tank, water supplied from the exterior into the management liquid measure 128 is supplied from the management liquid measure 128 into the outer water storage compartment 119 via water supply pipe 127, therefore, even when the water includes soil, sand, and the like, such soil, sand, and the like precipitate inside the management liquid measure 128 or water supply pipe 127, thereby enabling prevention of invasion of soil, sand, and the like into the outer water storage compartments 119. Note that the water supply pipe 127 has one end which is lower than the other end and which is connected to the management liquid measure 128, so that soil, sand, and the like precipitated inside the water supply pipe 127 flow along the inclination of the water supply pipe 127 after water supply from the exterior into the management liquid measure 128 is stopped, and reach the management liquid measure 128 and are accumulated at the bottom of the management liquid measure 128.

The invention resides in the underground water storage tank as shown in FIG. 25, further comprising multiple vertical pipes 171, and coupling pipes 172 for coupling the vertical pipes 171 to one another, the vertical pipes 171 and coupling pipes 172 being embedded in the second water-bearing materials 117;

wherein the other end of the water supply pipe 127 is connected to applicable one of the vertical pipes 171;

wherein the or each intake pipe 121 is provided at the first water-impermeable sheet 114 such that the other end of the or each intake pipe 121 is opened into the interior of applicable one of the vertical pipes 171; and wherein the non-return valve 122 is provided at the other end of the or each intake pipe 121 inside the applicable vertical pipe 171.

According to the underground water storage tank, water supplied from the exterior is conducted into the vertical pipes 171 constituting the outer water storage compartment 119 via management liquid measure 128 and water supply pipe 127, and flows into the internal water storage sub-tanks 111 via non-return valves 122 and intake pipes 121 from the vertical pipes 171, thereby enabling the water, which has been supplied from the exterior, and soil, sand, and the like of which have been precipitated, to be effectively stored within the internal water storage sub-tanks 111.

Effect of the Invention

According to the underground water storage tank of the present invention, the soil pressure absorption plates are provided outside the internal water storage sub-tanks, and the soil pressure absorption plates are coated with the second water-impermeable sheet, so that soil pressures from the surroundings are absorbed by the soil pressure absorption plates, thereby enabling avoidance of direct application of soil pressures to the first water-impermeable sheet, thereby allowing prevention of leakage of water stored in the internal water storage sub-tanks to the exterior. Further, when the water-bearing materials are rigid pipes made of resin, it becomes possible to decrease an occupying ratio of the water-bearing materials within the interior space of the internal water storage sub-tanks, thereby enabling an increased amount of water to be stored and avoiding that the unit cost of the underground water storage tank is increased. Moreover, when the rigid pipes are fitted on and affixed to the rod-like steel materials piled underground to thereby fix the assemblies of the water-bearing materials, it becomes possible to assemble a relatively large number of rigid pipes as water-bearing materials, thereby enabling an increased amount of rainwater to be stored in the underground water storage tank.

Further, when the internal water storage sub-tanks are plurally provided in the horizontal direction, it becomes possible to increase the amount of rainwater to be stored in the underground water storage tank, while interposition of the inter-tank cushioning materials between one internal water storage sub-tank and another internal water storage sub-tank allows prevention of breakage of the first water-impermeable sheet constituting the internal water storage sub-tanks, thereby avoiding such a situation that the stored water is fully leaked out. In this case, the outer water storage compartments including the soil pressure absorption plates are defined between the first water-impermeable sheet and the second water-impermeable sheet, the first intake pipes are provided to penetrate through the first water-impermeable sheet, and the first non-return valves are provided at the first intake pipes, respectively, thereby making it possible, by conducting water into the outer water storage compartments, to conduct the thus conducted water into the multiple internal storage sub-tanks via first non-return valves and first intake pipes and to store the water in the sub-tanks.

Further, in case of the underground water storage tank comprising: one or two or more second intake pipes each having one end set to penetrate through the second water-impermeable sheet and communicated with the outer water storage compartment, and the other end opened underground around the outer periphery of the second water-impermeable sheet; a second non-return valve provided at one end or other end of the or each second intake pipe; and a perforated tube formed with a plurality of water-permeable holes over a periphery thereof, and buried in a manner to have one end connected to the other end of the or each second intake pipe or to the second non-return valve, and the other end to be located above the second non-return valve; rainwater fallen over a relatively wide area and permeated underground and filtered to be clean, can be collected by the perforated pipe and conducted into the second intake pipes, and further taken into the underground water storage tank from the second intake pipe, so that the underground water storage tank is allowed to effectively collect and store therein rainwater fallen over the relatively wide area.

Further, according to another underground water storage tank of the present invention, the internal water storage sub-tank obtained by coating the first water-bearing materials with the first water-impermeable sheet is further coated with the second water-impermeable sheet, so that the soil pressures from the surroundings are applied to the second water-impermeable sheet to thereby prevent direct application of the soil pressures to the first water-impermeable sheet; and thus, even when the second water-impermeable sheet is broken due to soil pressures, it is possible to avoid breakage of the first water-impermeable sheet, thereby effectively enabling avoidance of leakage of water stored in the internal water storage sub-tank to the exterior. Further, the underground water storage tank is configured such that water to be stored in the internal water storage sub-tank is once supplied into the outer water storage compartment and flows therefrom into the internal water storage sub-tank via non-return valve and intake pipe, thereby effectively preventing a situation that the water inside the internal water storage sub-tank coated with the first water-impermeable sheet is leaked to the exterior even when the second water-impermeable sheet is broken and the water in the outer water storage compartment is leaked out.

Further, when the internal water storage sub-tanks are plurally arranged in a horizontal direction with second water-bearing materials interposed therebetween, there is allowed an increased amount of rainwater to be stored in the underground water storage tank while providing each internal water storage sub-tank in a scale which is easily constructed without increasing it into an enormous scale. Furthermore, the multiple internal water storage sub-tanks are made independent, thereby enabling inhibition of leakage of water stored in one internal water storage sub-tank even when the first water-impermeable sheet is broken at another internal water storage sub-tank, thereby enabling avoidance of such a situation that the stored water is fully leaked out. Here, when the second water-bearing materials are expanded resin plate materials each having a surface formed with multiple water flow grooves, it becomes possible to effectively absorb soil pressures applied from the surroundings to the second water-impermeable sheet. Further, when the second water-bearing materials are the expanded resin plate materials, the task for coating the second water-bearing materials with the second water-impermeable sheet to thereby obtain the outer water storage compartment is relatively facilitated as compared with a situation where the second water-bearing materials are made of sand, gravel, broken stones, or the like. Moreover, since the water-bearing ratio taken by the outer water storage compartment is a ratio taken by the multiple grooves in the second water-bearing materials, the water-bearing ratio itself can be decreased by decreasing the number of grooves or decreasing the cross-sectional areas thereof, such that the decreased water-bearing ratio allows the water level in the outer water storage compartment to be rapidly raised when water flows into the outer water storage compartment from the exterior, thereby enabling the water supplied into the outer water storage compartment to be rapidly delivered into the internal water storage sub-tanks.

Further, when the water supply pipe is provided at a lower portion of the outer water storage compartment such that the one end of the water supply pipes is located lower than the other end thereof; the one end of the water supply pipe is connected to a management liquid measure provided outside the second water-impermeable sheet; and the management liquid measure is configured so that water supplied to the management liquid measure is supplied into the outer water storage compartment from the management liquid measure through the water supply pipe; and even when the water includes soil, sand, and the like; such soil, sand, and the like precipitate inside the management liquid measure or perforated pipes, thereby enabling to prevent soil, sand, and the like from reaching the outer water storage compartment, and enabling only such rainwater, which is relatively clean, to be stored in the internal water storage sub-tanks. When it is configured that water to be stored in internal water storage is ground surface water flow and the ground surface water flow is caused to flow into the management liquid measure via grit tanks, it becomes possible that sand and gravel precipitate inside the grit tanks, thereby enabling more clean rainwater to be stored in the internal water storage.

Figure 1:
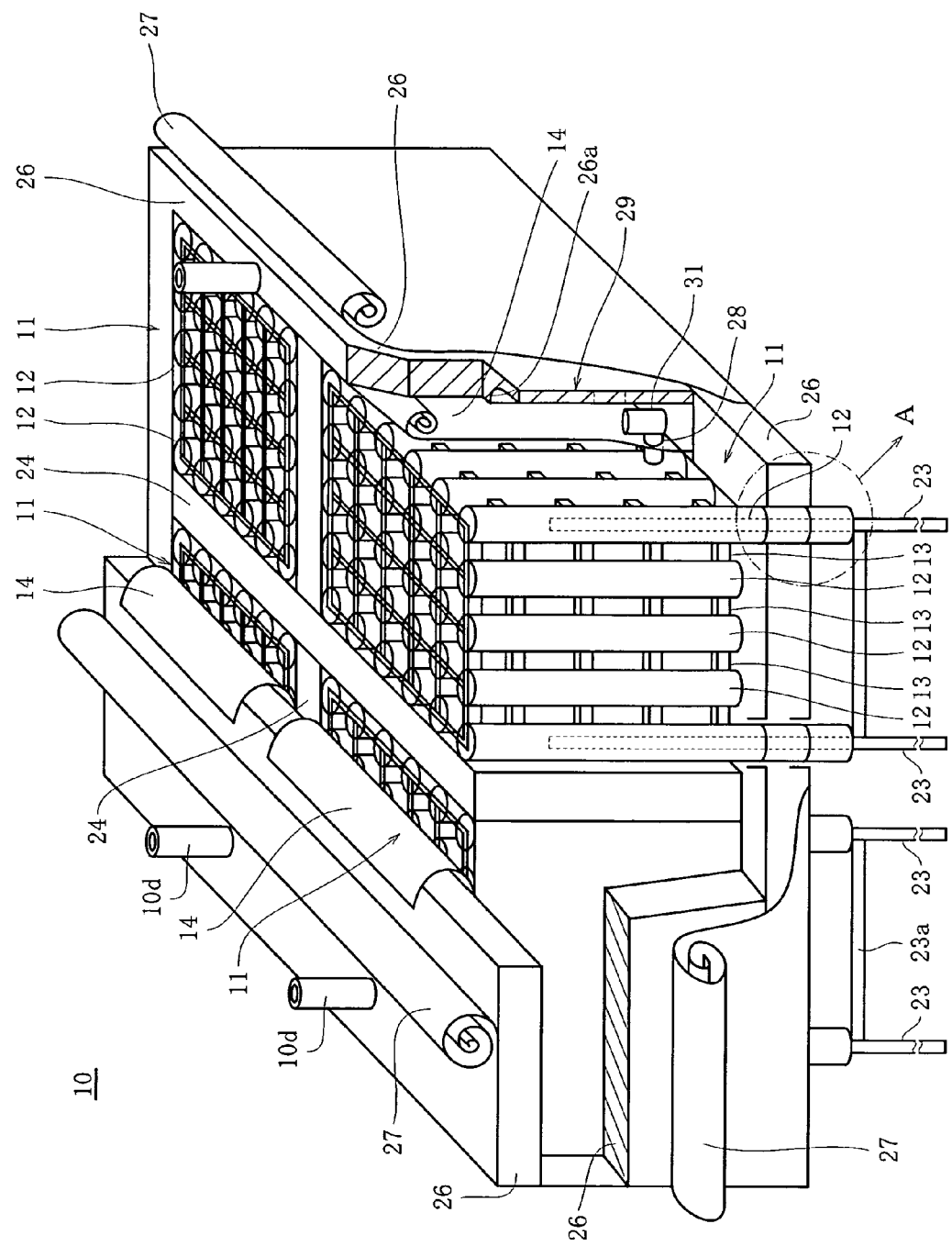
FIG. 1 A schematic perspective view of an underground water storage tank according to an embodiment of the present invention.

EXPLANATION OF REFERENCE NUMERALS 10 underground water storage tank
11 internal water storage sub-tank
12 rigid pipe (water-bearing material)
13 pipe coupling means
14 first water-impermeable sheet
23 H steel (rod-like steel material)
24 inter-tank cushioning material
26 soil pressure absorption plate
27 second water-impermeable sheet
28 first intake pipe
29 outer water storage compartment
31 first non-return valve
51 second intake pipe
52 second non-return valve
53 perforated pipe
53a water-permeable hole
71 vertical pipe
72 coupling pipe
110 underground water storage tank
111 internal water storage sub-tank 112 first water-bearing material
114 first water-impermeable sheet
117 second water-bearing material
118 second water-impermeable sheet
119 outer water storage compartment
121 intake pipe
122 non-return valve
127 water supply pipe
128 management liquid measure
171 vertical pipe
172 coupling pipe

BEST MODE FOR CARRYING OUT THE INVENTION

There will be explained the best mode for carrying out the present invention, based on the drawings.

Figure 2:
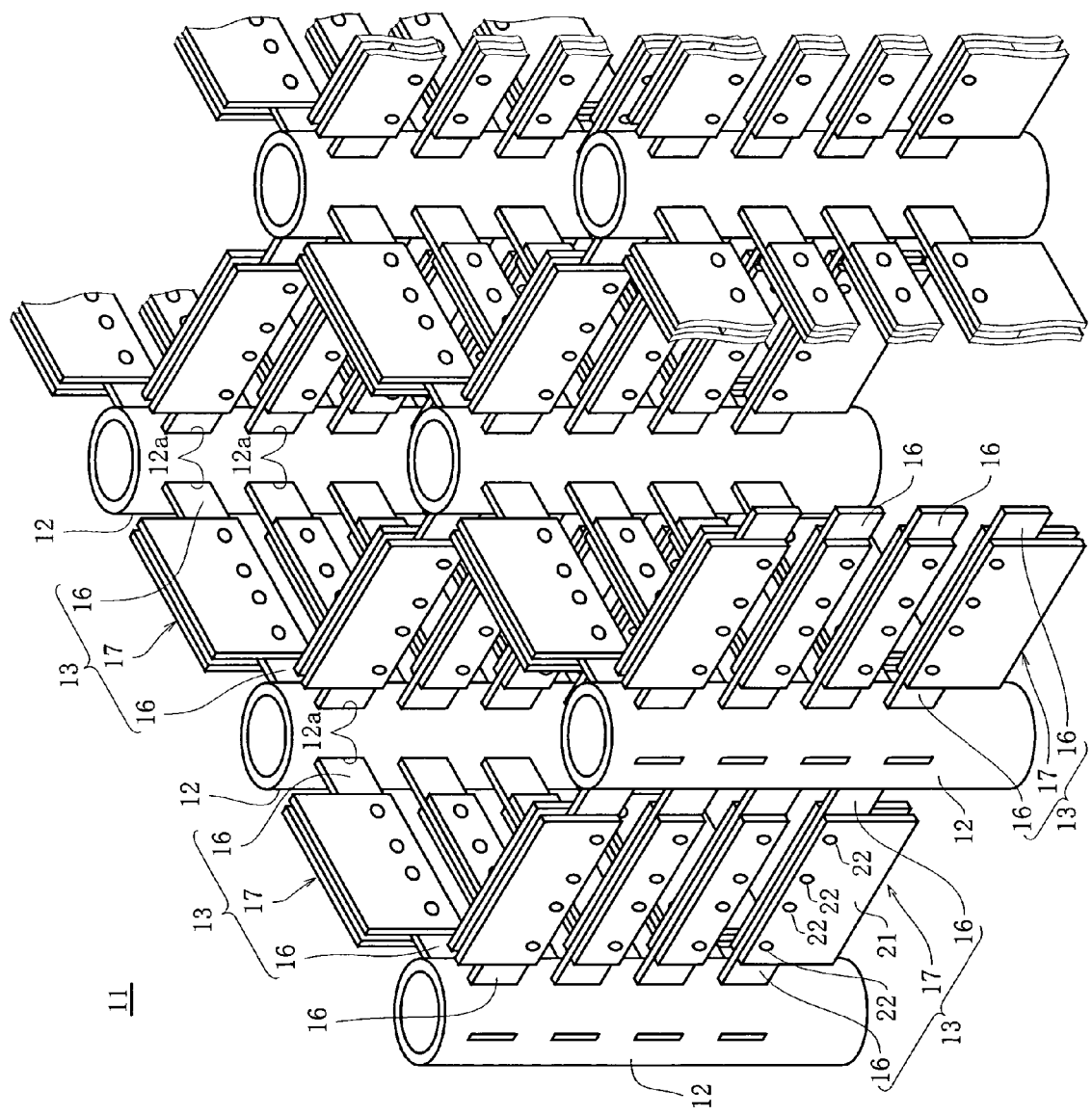
FIG. 2 A partial perspective view of an assembly of water-bearing materials of the tank.

As shown in FIG. 1, reference numeral 10 designates an underground water storage tank of the present invention which is to be buried underground and is provided with internal water storage sub-tanks 11. The internal water storage sub-tanks 11 are each provided by coating an assembly of water-bearing materials 12 obtained by combining multiple water-bearing materials 12 with one another with a first water-impermeable sheet 14, and rigid pipes 12 made of plastics are used as the water-bearing materials 12 in this embodiment, respectively. As shown in FIG. 2, the rigid pipes 12 are prepared in plural, and the assembly of the water-bearing materials 12 is established by mutually coupling the plurality of rigid pipes 12 by pipe coupling means 13. Concretely explaining, the plurality of rigid pipes 12 are arranged in a horizontal direction and vertically oriented in a state that the rigid pipes are mutually parallelized. Used as the rigid pipes 12 acting as the water-bearing materials in this embodiment, are pipes each made of extrusion formed vinyl chloride and having a diameter of 200 to 800 mm and a length of 50 to 400 cm. Diameters less than 200 mm or lengths less than 50 cm of rigid pipes 12 increase the number of man-hours in an arrangement task of rigid pipes 12 upon forming the water storage tank 10, and diameters exceeding 800 mm or lengths exceeding 40 cm of rigid pipes 12 make it difficult to convey the rigid pipes 12.

Figure 3:
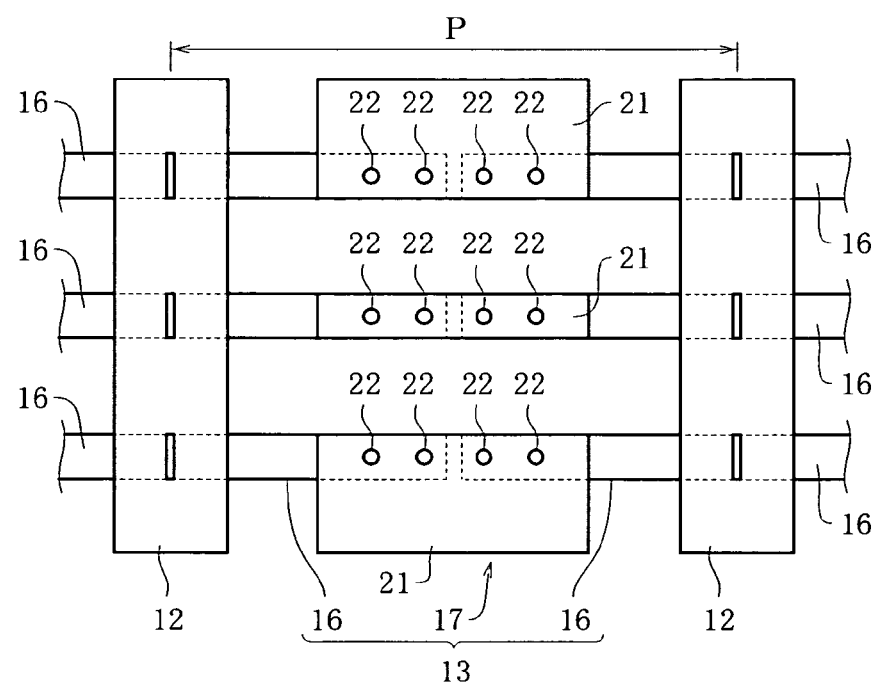
FIG. 3 A front view of rigid pipes as the water-bearing materials of the tank in a state where the rigid pipes are coupled to each other.
Figure 4:
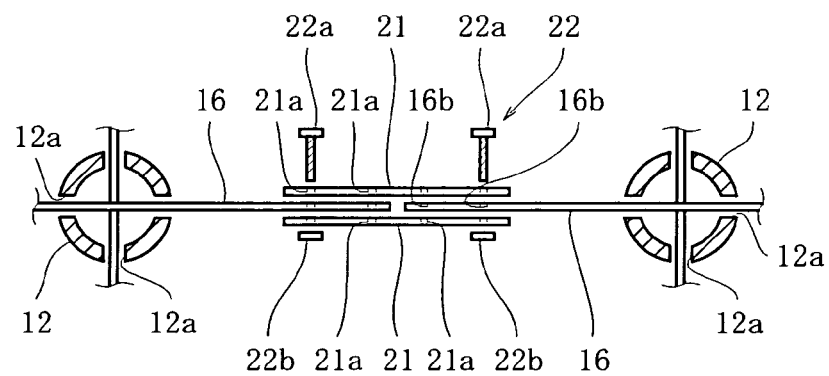
FIG. 4 A top view of the rigid pipes of the tank showing a state where the rigid pipes are coupled to each other.

As shown in FIG. 2 through FIG. 4, the pipe coupling means 13 are provided with: fixation plates 16 fixed to the rigid pipes 12 such that the fixation plates are orthogonalized to central axes of the rigid pipes 12, respectively, and one end or both ends of the fixation plates 16 are protruded from outer peripheries of the rigid pipes 12, respectively; and fastening means 17 each adapted for fastening associated one fixation plate 16 fixed to one rigid pipe 12, to associated another fixation plate 16 fixed to another rigid pipe 12 adjacent to the one rigid pipe 12. The fixation plates 16 are set to penetrate through mount holes 12a formed in the associated rigid pipes 12, and fixed thereto, respectively. The plurality of rigid pipes 12 are disposed longitudinally and laterally in a horizontal plane into a rectangle pattern, and mutually and parallelizedly coupled by the coupling means 13, respectively, in a vertically upstanding manner at predetermined intervals in a horizontal direction, in this embodiment, at pitches P (FIG. 3) of 50 to 200 cm. As such, fixation plates 16, 16 orthogonalizedly fixed in each stage of a rigid pipe 12 at each corner, are fixed to the rigid pipe 12 such that both the fixation plates have one ends protruded from an outer periphery of the rigid pipe 12, respectively. For fixation plates 16, 16 orthogonalizedly fixed in each stage of a rigid pipe 12 positioned at each outer side, one of them has one end protruded from an outer periphery of the rigid pipe 12, and the other has both ends protruded from the outer periphery of the rigid pipe 12. Further, for fixation plates 16, 16 orthogonalizedly fixed in each stage of each rigid pipe 12 positioned inwardly, both the fixation plates have both ends protruded from an outer surface of the rigid pipe 12, respectively.

As shown in FIG. 3 and FIG. 4, fastening means 17 are each provided with: coupling plates 21 configured to be overlapped with both of one fixation plate 16 fixed to one rigid pipe 12 and the other fixation plate 16 fixed to the other rigid pipe 12 adjacent to the one rigid pipe 12; and screw means 22 for fixing the coupling plates 21 to both the one fixation plate 16 and the other fixation plate 16. The one fixation plate 16 and other fixation plate 16 are each formed with a plurality of through-holes 16b at the same pitch, and the coupling plates 21 are each formed with a plurality of communication holes 21a corresponding to the through-holes 16b, respectively. One fixation plate 16 and the other fixation plate 16 are interposed between a pair of coupling plates 21, 21 in a state that butt ends of the fixation plates 16 are opposed to each other, to thereby align the communication holes 21a with the through-holes 16b, respectively. The screw means 22 comprises bolts 22a and nuts 22b, and the bolts 22a are set to penetrate through the communication holes 21a and through-holes 16b and then threadedly engaged with the nuts 22b to thereby fix the one fixation plate 16, other fixation plate 16, and the pair of coupling plates 21 to one another by the screw means 22, thereby mutually fastening the one fixation plate 16 fixed to the one rigid pipe 12 to the other fixation plate 16 fixed to the other rigid pipe 12 adjacent to the one rigid pipe 12.

Returning to FIG. 1, rod-like steel materials 23 are vertically piled underground where the underground water storage tank 10 is provided, and the applicable rigid pipes 12 are fitted onto and affixed to the rod-like steel materials 23, respectively, so that the assemblies of water-bearing materials 12 are fixed to the rod-like steel materials 23, respectively. Used as the rod-like steel materials 23 in this embodiment are so-called H steels 23 each having an H-shaped cross-section, and the assemblies of water-bearing materials 12 provided by fitting applicable rigid pipes 12 onto the H steels 23 are coated with the first water-impermeable sheet 14 to thereby constitute the internal water storage sub-tanks 11. Here, examples of the first water-impermeable sheet 14 include a waterproof sheet made of resin such as synthetic rubber, polypropylene, or the like. The thus constituted internal water storage sub-tanks 11 are plurally provided in a horizontal direction with inter-tank cushioning materials 24 interposed therebetween, respectively, and examples of the inter-tank cushioning materials 24 include plates made of foamed bodies such as expanded polystyrene, expanded vinyl chloride, or the like, or extruded hollow articles. Further, provided outside the internal water storage sub-tanks 11 are soil pressure absorption plates 26, and the soil pressure absorption plates 26 are coated with a second water-impermeable sheet 27. Examples of the soil pressure absorption plates 26 include plates made of foamed bodies such as expanded polystyrene, expanded vinyl chloride, or the like, or extruded hollow articles like the inter-tank cushioning material 24, and examples of the second water-impermeable sheet 27 include waterproof sheets made of resin such as synthetic rubber, polypropylene, or the like.

Figure 7:
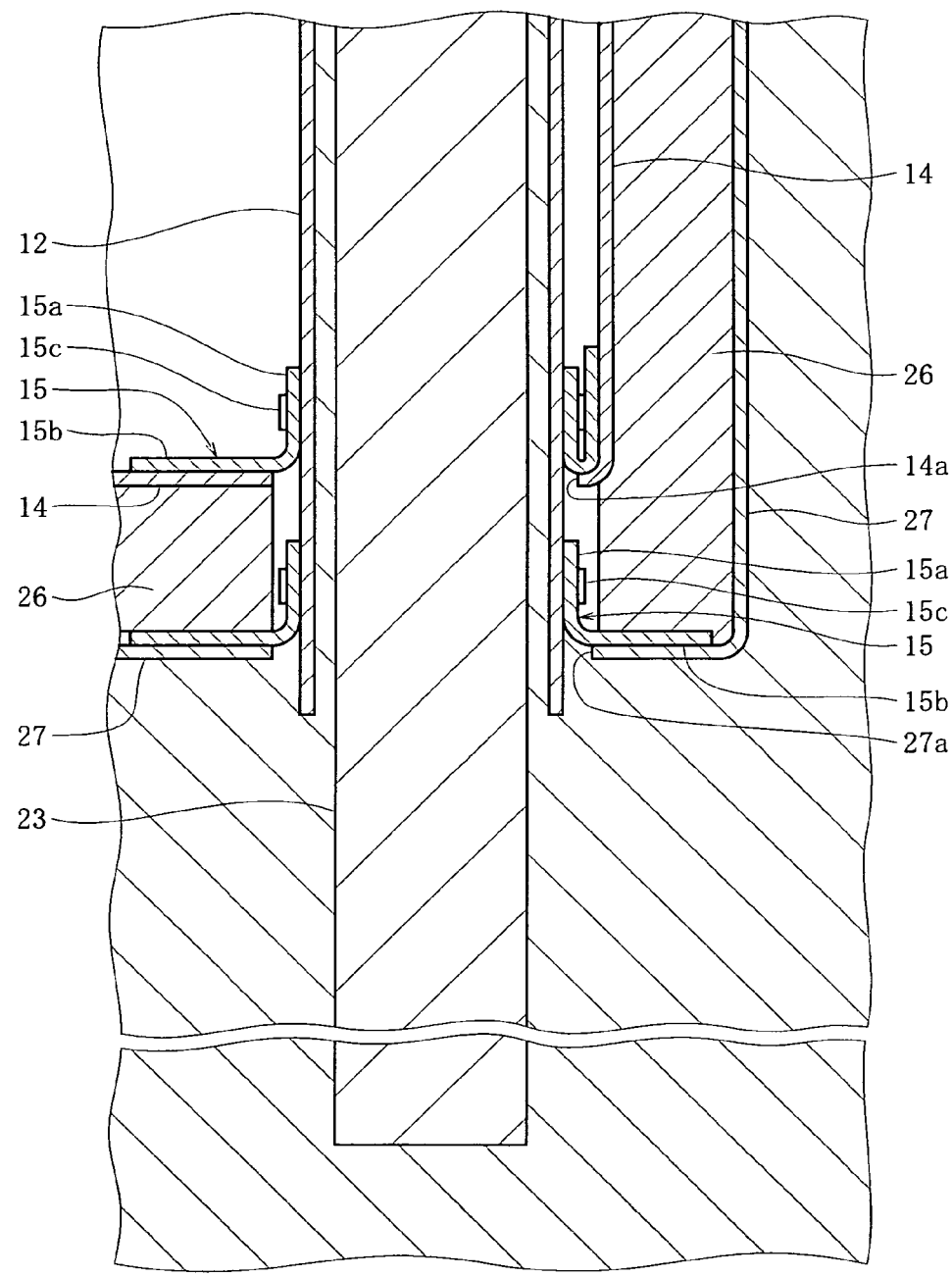
FIG. 7 An enlarged cross-sectional view of a part "A" of FIG. 1.
Figure 8:
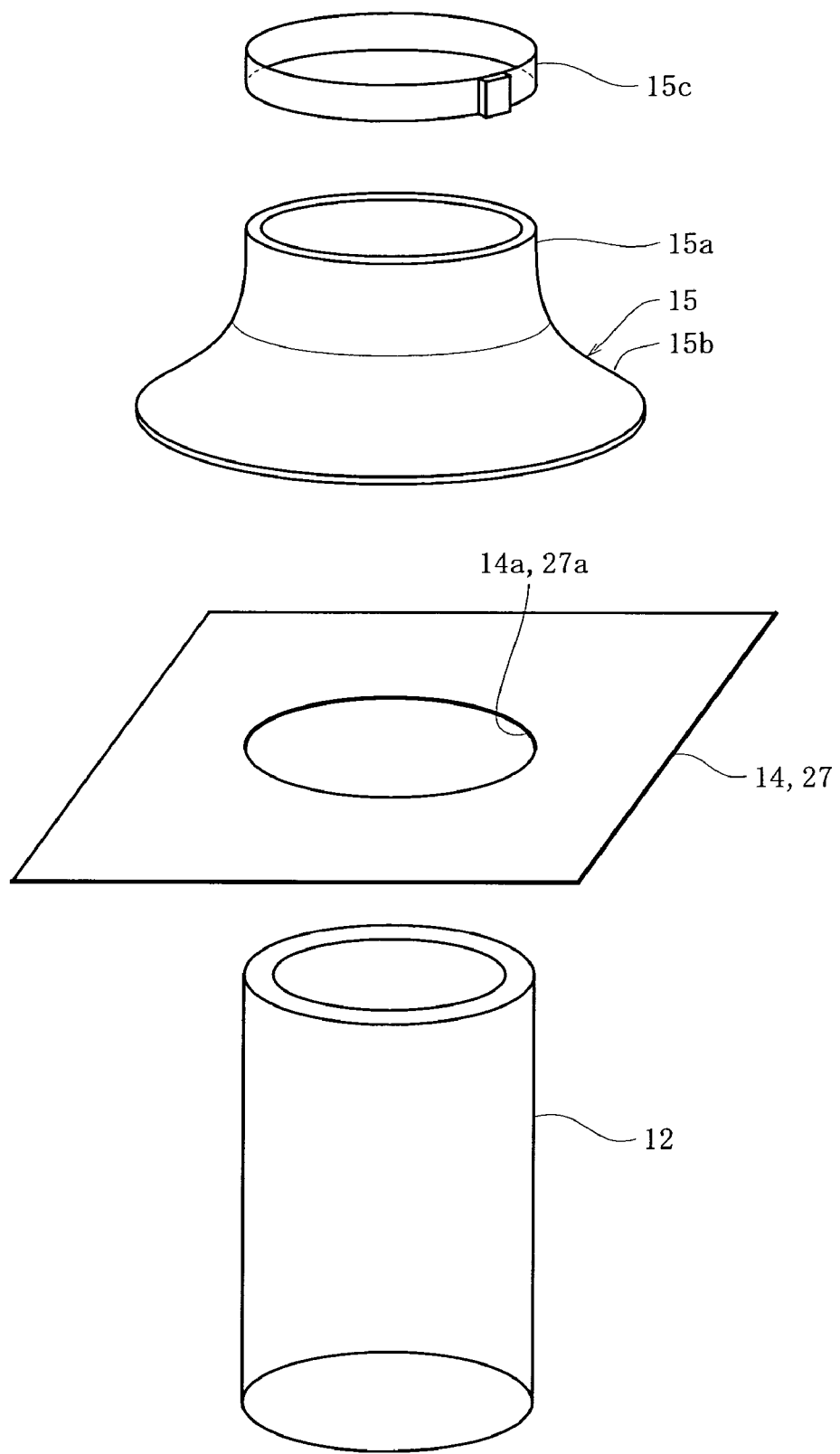
FIG. 8 An exploded view of a water-impermeable sheet, the rigid pipe, and a skirt member showing a state where the rigid pipe set to penetrate through the water-impermeable sheet is bonded to the water-impermeable sheet through the skirt member.

As shown in FIG. 7, each rod-like steel material 23 penetrates through a hole 27a formed in a second water-impermeable sheet 27 and a hole 14a formed in a first water-impermeable sheet 14, and the lower portion of the associated rigid pipe 12 fitted on the upper portion of the rod-like steel material 23 further penetrates through the hole 27a and hole 14a. Further, the second water-impermeable sheet 27 and the rigid pipe 12, and the first water-impermeable sheet 14 and the rigid pipe 12, are closely contacted with each other by means of skirt-like sheets 15, respectively. As shown in FIG. 8, the skirt-like sheets 15 each have a small diameter portion 15a having substantially the same inner diameter as an outer diameter of the associated rigid pipe 12, and a large diameter portion 15b endwise widened from the small diameter portion 15a. The large diameter portion 15b is welded to the second water-impermeable sheet 27 or first water-impermeable sheet 14, and, in that state, the small diameter portion 15a is fitted onto the rigid pipe 12 and the periphery thereof is tightened by a band 15c. In this way, the second water-impermeable sheet 27 and rigid pipe 12, and the first water-impermeable sheet 14 and rigid pipe 12, are closely contacted with each other by means of the skirt-like sheets 15, respectively, and configured such that water stored in the associated internal water storage sub-tank 11 is prevented from leaking to the exterior through this portion. Further, additional rigid pipes 12 are successively coupled to the rigid pipe 12 fitted on the associated H steel 23, thereby improving stability of the assembly of water-bearing materials 12.

Returning to FIG. 1, each soil pressure absorption plate 26 is formed with a concave grooves 26a at a side of the former facing to the first water-impermeable sheet 14, and the existence of the concave groove 26a constitutionally causes the first water-impermeable sheet 14 and second water-impermeable sheet 27 to be capable of storing water therebetween, in a manner to define an associated outer water storage compartment 29 including the soil pressure absorption plate 26 between the first water-impermeable sheet 14 and second water-impermeable sheet 27. The first water-impermeable sheet 14 is provided with first intake pipes 28 each penetrating therethrough and having one end communicated with the associated internal water storage sub-tank 11 and the other end opened into the associated outer water storage compartment 29. The first intake pipes 28 in this embodiment are provided around four internal water storage sub-tanks 11, respectively (FIG. 1 shows the first intake pipe provided at the internal water storage sub-tank 11 at the right of the near side). Each first intake pipe 28 has its one end penetrating through the waterproof sheet 14 of the internal water storage sub-tank 11 and adheredly fixed and mounted thereto so that the butt end of the one end is faced to the interior of the internal water storage sub-tank 11. Each first intake pipe 28 is arranged near a lower end of the first water-impermeable sheet 14 forming a side portion of the internal water storage sub-tank 11, and each first intake pipe 28 has the other end thereof having a first non-return valve 31 attached thereto.

Figure 5:
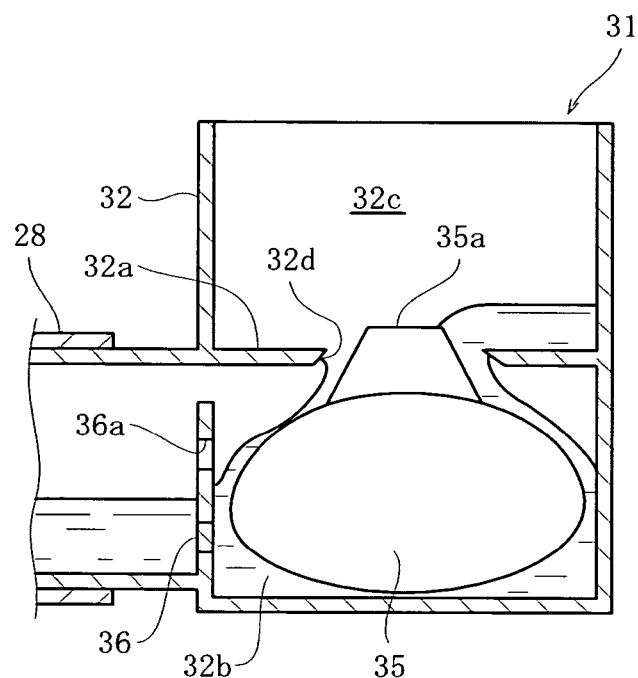
FIG. 5 A cross-sectional view of a first non-return valve of the tank showing a state where the first non-return valve allows for water flow.
Figure 6:
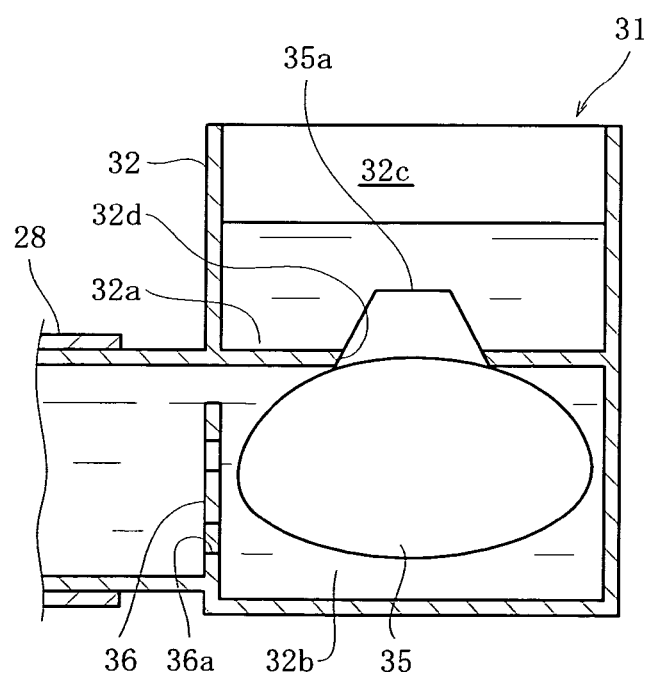
FIG. 6 A cross-sectional view of the first non-return valve showing a state where the same inhibits water flow.

As shown in FIG. 5 and FIG. 6, the first non-return valve 31 has a cylindrical casing 32 having an interior divided into a first chamber 32b and a second chamber 32c by a partition wall 32a provided substantially in the center thereof, and a float 35 accommodated in the first chamber 32b. The other end of the first intake pipe 28 is provided at a side portion of the casing 32 in a manner communicated with the first chamber 32b, and the connecting portion of the other end of the first intake pipe 28 to the casing 32 is provided with a wall portion 36 formed with a plurality of holes 36a through which rainwater is allowed to flow. The partition wall 32a has a central portion formed with a circular hole 32d, and the float 35 opposed to the circular hole 32d is formed with a protrusion 35a in a truncated conical shape adapted to be inserted into the circular hole 32d to thereby close it. The float 35 is configured to be float on water, and as shown in FIG. 5, to sink in the first chamber 32b when the first chamber 32b accommodating the float 35 therein is not filled with rainwater or when the water pressure at the other end of the first intake pipe 28 is equal to or higher than the water pressure at the one end of the first intake pipe 28, so that the protrusion 35a thereof is departed from the circular hole 32d to thereby allow water to flow from the other end of the first intake pipe 28 to the one end thereof. Meanwhile, as shown in FIG. 6, the float 35 is configured to float in the interior of the first chamber 32b when the first chamber 32b accommodating the float 35 therein is filled with water and the water pressure at the other end side of the first intake pipe 28 is lowered such that the water pressure at the other end side of the first intake pipe 28 is brought to be lower than the water pressure at the one end side of the first intake pipe 28, so that the protrusion 35a closes the circular hole 32d to prevent water from flowing through the first intake pipe 28 to thereby prevent water of the associated internal water storage sub-tank 11 from flowing out.

Figure 9:
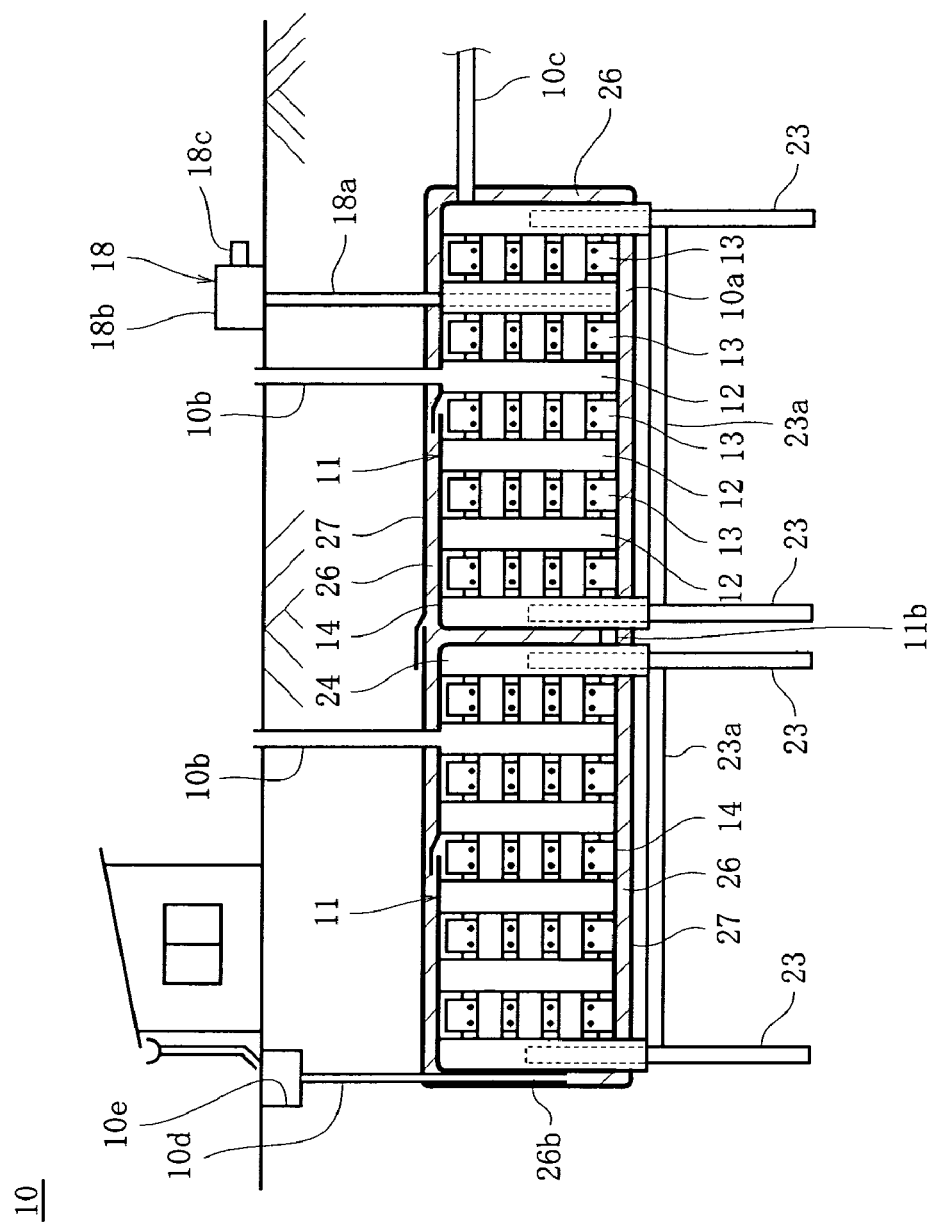
FIG. 9 A cross-sectional view of the entire configuration of the underground where the underground water storage tank is provided.

Explaining a procedure for producing such an underground water storage tank 10, there is excavated a place where the underground water storage tank 10 is to be formed, in accordance with required depth and shape. Thereafter, as shown in FIG. 9, multiple H steels 23 are vertically piled into the excavated place at predetermined intervals, and the second water-impermeable sheet 27 is arranged by setting the H steels 23 to penetrate therethrough. At this time, reinforcement steel materials 23a are provided to horizontally extend to couple the vertically piled H steels 23 to one another, and the second water-impermeable sheet 27 is arranged above the reinforcement steel materials 23a in a manner penetrated by the H steels 23, respectively. As shown in FIG. 7, each H steel 23 penetrating through the second water-impermeable sheet 27 carries the associated rigid pipe 12 fitted thereon, and the periphery of the second water-impermeable sheet 27 penetrated by the H steel 23 is closely contacted with the periphery of the rigid pipe 12 by the skirt-like sheet 15 (FIG. 8).

Returning to FIG. 9, the soil pressure absorption plates 26 are spreadedly laid at a central portion of second water-impermeable sheet 27 and over an extent for forming the underground water storage tank 10. Thereafter, the first water-impermeable sheet 14 is arranged on the soil pressure absorption plates 26 over an extent for forming the internal water storage sub-tanks 11. When an applicable H steel 23 exists at such an arrangement location, the first water-impermeable sheet 14 is arranged to be penetrated by the associated rigid pipe 12 fitted on the H steel 23. As shown in FIG. 7, the rigid pipe 12 penetrating through the first water-impermeable sheet 14 is closely contacted with the periphery of the penetrated first water-impermeable sheet 14 by means of the skirt-like sheet 15 (FIG. 8). Formed above the first water-impermeable sheets 14 are the assemblies of water-bearing materials 12. The rigid pipes 12 acting as the water-bearing materials 12 include those fitted on the associated H steels 23, respectively, and other rigid pipes 12 are successively coupled to the rigid pipes 12 fitted on the H steels 23 by means of the coupling means 13, thereby allowing improvement of stability of the assemblies of the water-bearing materials 12. The rigid pipes 12 fitted on the H steels 23 are filled with clay or concrete (FIG. 7) so as to prevent movements of the rigid pipes 12 fitted on the H steels 23, respectively.

As shown in FIG. 1, the assemblies of the water-bearing materials 12 are coated with the first water-impermeable sheet 14 to thereby define multiple internal water storage sub-tanks 11 on the soil pressure absorption plates 26, respectively, and inter-tank cushioning materials 24 are each provided between one of the internal water storage sub-tanks 11 and another of the internal water storage sub-tanks 11 adjacent thereto. Further, each first intake pipe 28 is provided to penetrate through the first water-impermeable sheet 14 at a portion of the first water-impermeable sheet 14 facing to the associated outer water storage compartment 29, and the associated first non-return valve 31 is provided at the other end of the first intake pipe 28. Thereafter, the cooperative entire periphery and the cooperative upper surface of the internal water storage sub-tanks 11 are coated with soil pressure absorption plates 26, and the soil pressure absorption plates 26 together with the multiple internal water storage sub-tanks 11 are wrapped with the continuously established second water-impermeable sheet 27. Concretely, the periphery of the second water-impermeable sheet 27 is raised up to surround the whole of the multiple internal water storage sub-tanks 11 together with the soil pressure absorption foamed bodies with the second water-impermeable sheet 27, and thereafter the end portions of the second water-impermeable sheet are placed on the cooperative upper surface of the upwardly provided soil pressure absorption plates 26 to thereby wrap around the whole of the multiple internal water storage sub-tanks 11 by the second water-impermeable sheet 27. This provides the underground water storage tank 10.

As shown in FIG. 9, the thus configured underground water storage tank 10 is connected with intake pipes 10d, breathing pipes 10b, an overflow pipe 10c, and drainage pipes 18a, and then the water storage tank 10 is buried back so that upper ends of the intake pipes 10d, breathing pipes 10b and drainage pipes 18a are exposed to the surface of the ground. The upper ends of the intake pipes 10d are subsequently connected to rainwater collection ditches 10e or the like at the surface of the ground, respectively, and are configured to cause rainwater collected into the ditches 10e or the like to flow into the outer water storage compartments 26b of the water storage tank 10. The breathing pipes 10b are configured to release interior air to the exterior on the ground and to cause air at the exterior on the ground to flow into the interior of the water storage tank 10 upon inflow of water from the intake pipes 10d and drainage of water via drainage means 18 to be described later, respectively. The overflow pipe 10c is configured to conduct excessive water from the water storage tank 10 to the exterior on the ground or to another water storage tank (not shown), upon inflow of water exceeding an interior volume of the water storage tank 10.

Further, provided at the surface of the ground above the buried water storage tank 10 and at a collective position of upper ends of the drainage pipes 18a, is drainage means 18 capable of taking up the water stored in the water storage tank 10. The drainage means 18 is constituted of: the multiple drainage pipes 18a (only one of them is shown in FIG. 9) having lower ends penetrating through the first water-impermeable sheet 14 at the internal water storage sub-tanks 11 to reach the bottoms of the sub-tanks, respectively; and a drainage pump 18b provided on the ground and capable of sucking water inside the water storage tank 10 from the upper ends of the drainage pipes 18a. The drainage means 18 is configured to extract the water of the water storage tank 10 from the exterior, by sucking the water inside the water storage tank 10 by the drainage pump 18b through the drainage pipes 18a and discharging the water from a discharge pipe 18c.

In such an underground water storage tank 10, the soil pressure absorption plates 26 are provided outside the internal water storage sub-tanks 11 and the soil pressure absorption plates 26 are coated with the second water-impermeable sheet 27, so that soil pressures from the surroundings are applied to the second water-impermeable sheet 27 and absorbed by the soil pressure absorption plates 26, thereby allowing prevention of direct application of the soil pressures to the first water-impermeable sheet 14. This enables avoidance of breakage of the first water-impermeable sheet 14 even when the second water-impermeable sheet 27 is broken by the soil pressures, thereby effectively enabling prevention of leakage of the water stored in the internal water storage sub-tanks to the exterior. Further, adopting the rigid pipes 12 as the water-bearing materials enables a decreased ratio of the water-bearing materials 12 occupying in the interior space of the internal water storage sub-tanks 11 as compared with water-bearing materials comprising sand, gravel, broken stones, or the like, thereby enabling an increased amount of rainwater to be stored. Here, the rigid pipes 12 are prepared in a large number by extrusion forming and are thus relatively inexpensive, and the rigid pipes 12 are arranged at predetermined intervals therebetween in a horizontal direction and are mutually coupled by the coupling means 13, thereby enabling the number of used rigid pipes 12 to be decreased to avoid that the unit cost is increased due to the increased number of used rigid pipes.

Further, the assemblies of the water-bearing materials are fixed to the rod-like steel materials piled underground, thereby avoiding collapse of the assemblies. This enables a relatively large number of rigid pipes 12 acting as water-bearing materials to be assembled, thereby enabling an increased amount of rainwater to be stored in the underground water storage tank 10. Further, the internal water storage sub-tanks 11 are plurally provided, thereby enabling prevention of leakage of water stored in one internal water storage sub-tank 11 even when the first water-impermeable sheet 14 is broken at another internal water storage sub-tank 11, thereby enabling avoidance of such a situation that the stored water is fully leaked out. Further, the internal water storage sub-tanks 11 are plurally provided with inter-tank cushioning materials 24 interposed therebetween, respectively, thereby enabling avoidance of breakage of the first water-impermeable sheet 14 due to the provision of multiple sub-tanks. Here, the outer water storage compartments 29 including the soil pressure absorption plates 26 are defined between the first water-impermeable sheet 14 and the second water-impermeable sheet 27, and the first intake pipes 28 having one ends communicated with the internal water storage sub-tanks 11 and the other ends opened to the outer water storage compartments 29, respectively, are provided to penetrate through the first water-impermeable sheet 14 such that the other ends are provided with the first non-return valves 31, respectively, thereby enabling conduction of water to the outer water storage compartments 29 to thereby conduct and store the water into the multiple internal storage sub-tanks 11 via first non-return valves 31 and first intake pipes 28, respectively.

Note that although the above-described embodiment has been explained for the situation where the respective internal water storage sub-tanks 11 are independently provided and the respective internal water storage sub-tanks 11 are provided with the drainage pipes 18a penetrating through the first water-impermeable sheet 14 there, it is possible to couple a lower portion of one internal water storage sub-tank 11 to a lower portion of another internal water storage sub-tank 11 adjacent thereto through a communication pipe. When the multiple internal water storage sub-tanks 11 are communicated to one another in this way, only provision of a single drainage pipe 18a for one of the internal water storage sub-tanks 11 enables extraction of water stored in all the internal water storage sub-tanks 11 through the single drainage pipe 18a.

Figure 10:
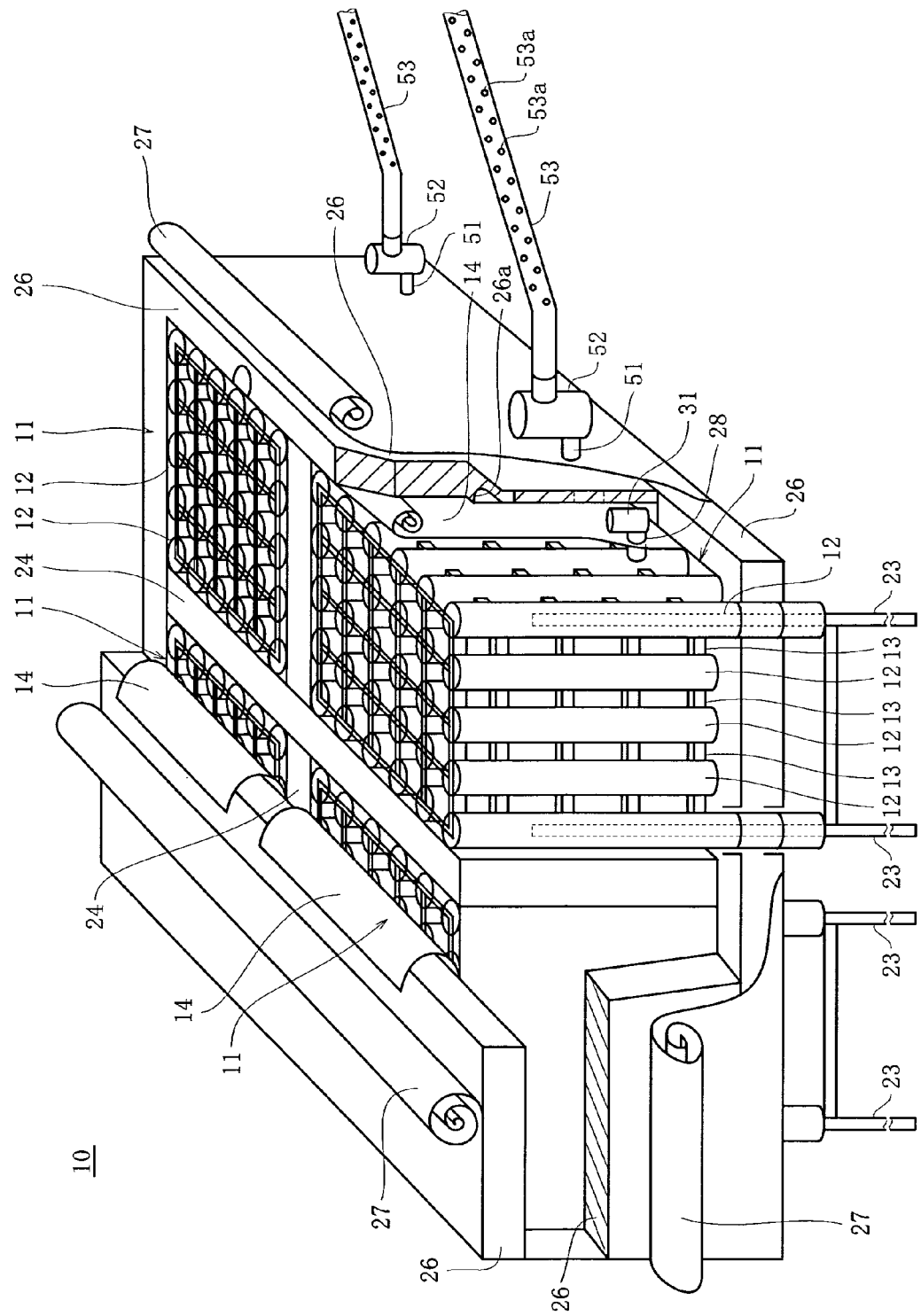
FIG. 10 A schematic perspective view of an underground water storage tank provided with perforated tubes around the periphery thereof.
Figure 11:
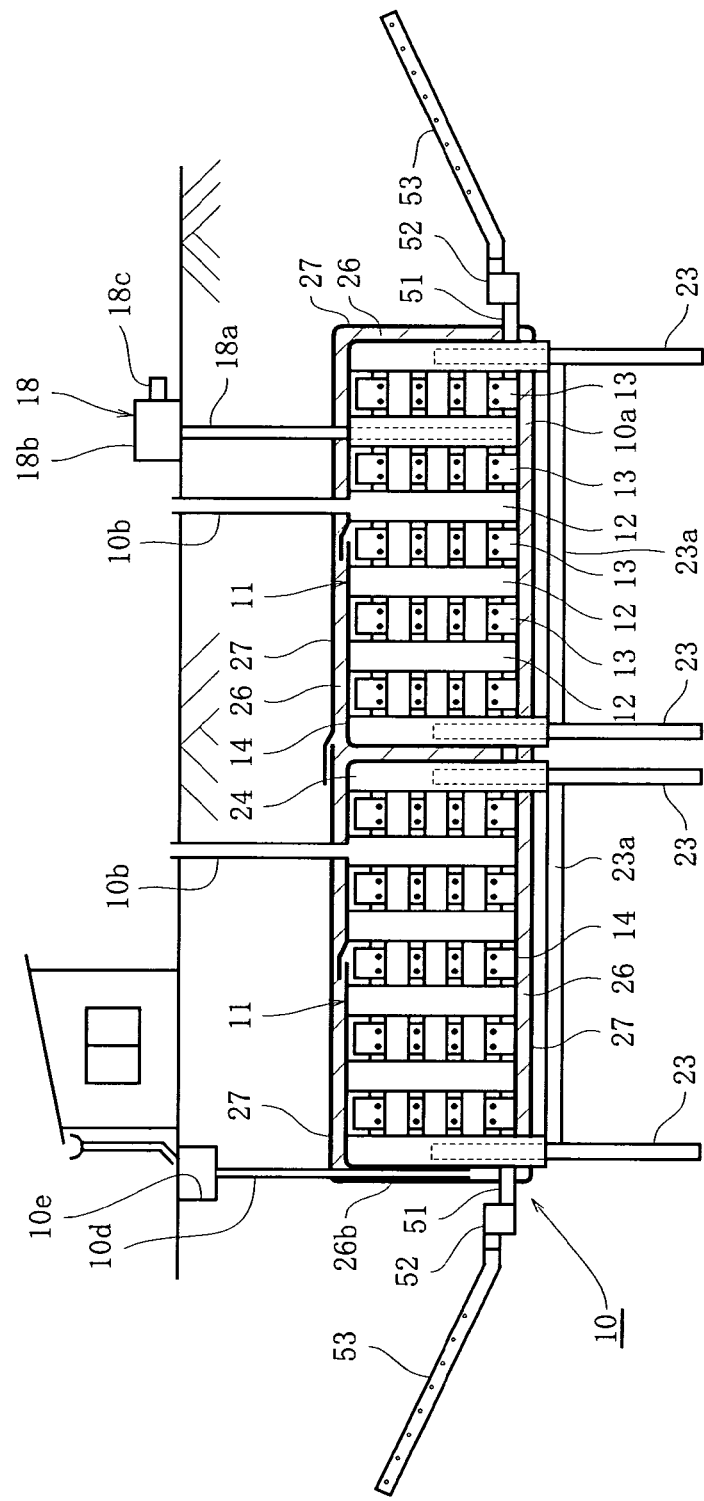
FIG. 11 A cross-sectional view of the entire configuration of the underground where the underground water storage tank is provided.

Shown in FIG. 10 and FIG. 11 is an underground water storage tank having perforated tubes 53 buried therearound. The underground water storage tank 10 is provided with: one or two or more second intake pipes 51 each having one end set to penetrate through the second water-impermeable sheet 27 and communicated with the associated outer water storage compartment 29, and the other end opened underground around the outer periphery of the second water-impermeable sheet 27; second non-return valves 52 each provided at the other end of the associated second intake pipe 51, in a manner to allow water to flow from the other end of the second intake pipe 51 to the one end thereof when the water pressure at the other end of the second intake pipe 51 is equal to or higher than the water pressure at the one end of the second intake pipe 51, and to prevent water from flowing from the one end of the second intake pipe 51 to the other end thereof when the water pressure at the other end of the second intake pipe 51 is lower than the water pressure at the one end of the second intake pipe 51; and perforated tubes 53 each formed with a plurality of water-permeable holes 53a over a periphery thereof, and buried in a manner to have one end connected to the associated second non-return valve 52, and the other end to be located above the second non-return valve 52.

Figure 12:
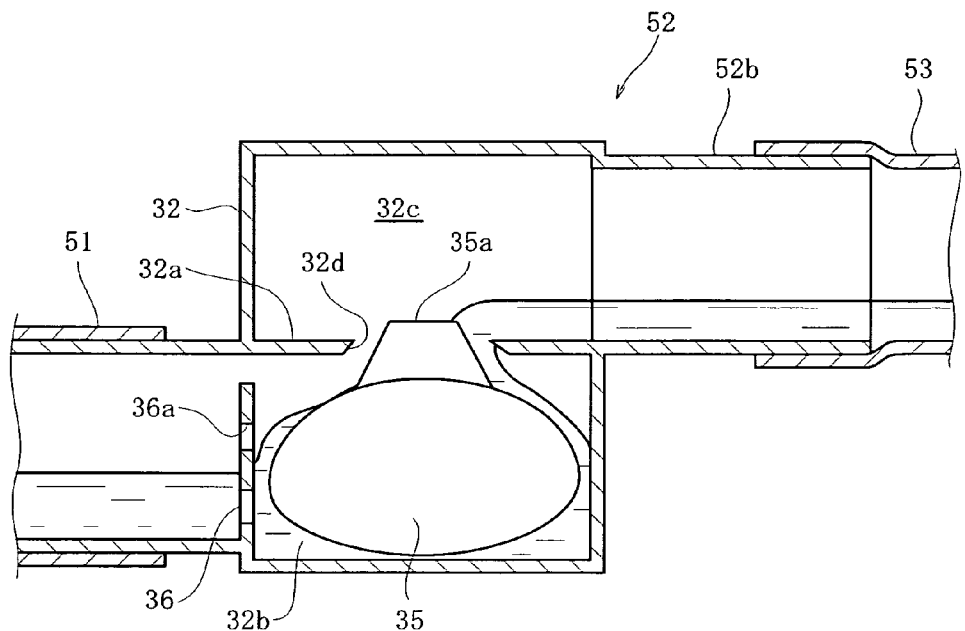
FIG. 12 A cross-sectional view of a second non-return valve of the tank showing a state where the second non-return valve allows for water flow.
Figure 13:
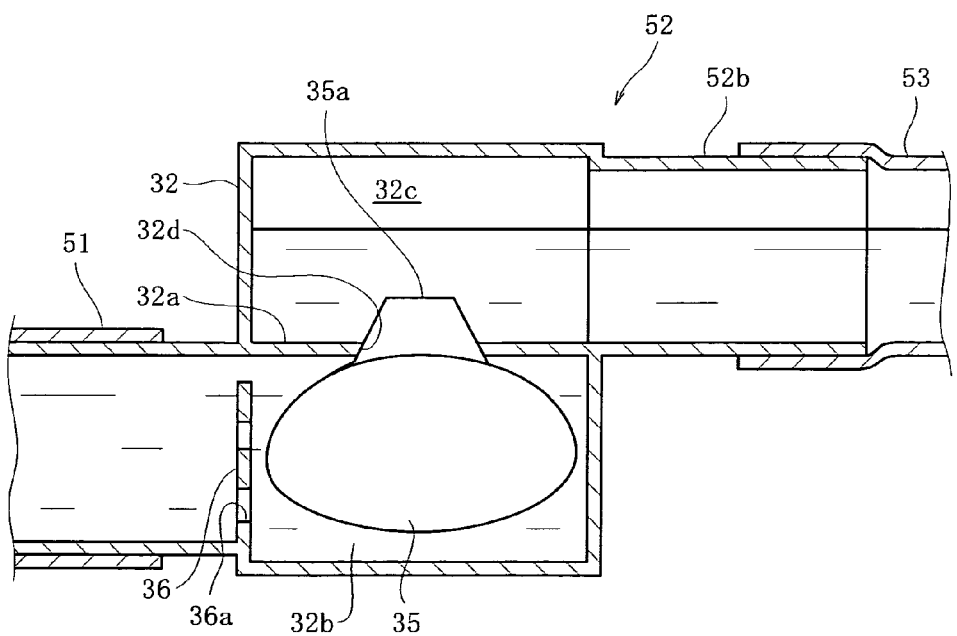
FIG. 13 A cross-sectional view of the second non-return valve showing a state where the same inhibits water flow.

In this embodiment, the underground water storage tank 10 is buried in such a soil like a sandy soil which tends to allow rainwater to permeate therethrough. The second intake pipes 51 are each provided to have the one end penetrating through the second water-impermeable sheet 27 of the underground water storage tank 10 and communicated with the associated outer water storage compartment 29, and the other end opened underground around the underground water storage tank 10. The second intake pipes 51 in this embodiment are provided at the periphery of the underground water storage tank 10, respectively (the figure shows those provided at right and left side surfaces). As shown in FIG. 12 and FIG. 13, the second non-return valves 52 are each provided in substantially the same structure as the first non-return valve 31, and each have: a cylindrical casing 32 divided into a first chamber 32b and a second chamber 32c by a partition wall 32a provided substantially centrally; and a float 35 accommodated in the first chamber 32b. The associated second intake pipe 51 is disposed at the side portion of the casing 32 so as to be communicated with the first chamber 32b. However, there is provided an upstream side cylinder portion 52b communicated with the second chamber 32c, at an upper side portion of the casing 32 at a position symmetric with respect to a downstream side cylinder portion 21a.

The float 35 is configured to float on water in a manner: to sink to allow water to flow from the other end of the second intake pipe 51 to the one end thereof when the water pressure at the other end at the second intake pipe 51 is equal to or higher than the water pressure at the one end of the second intake pipe 51 as shown in FIG. 12; and to float up to close the circular hole 32d to thereby prevent water from flowing from the one end of the second intake pipe 51 to the other end thereof when the water pressure at the other end of the second intake pipe 51 is lower than the water pressure at the one end thereof as shown in FIG. 13.

As shown in FIG. 10 and FIG. 11, the second intake pipes 51 provided at the side portion of the underground water storage tank 10 have other ends of the perforated tubes 53 having one ends of the associated perforated tubes 53 attached thereto, respectively. The perforated tubes 53 are each formed with the plurality of water-permeable holes 53a, and have other ends buried underground above the other ends of the second intake pipes 51, respectively. In this embodiment, the perforated tubes 53 have other ends buried underground near the surface of the ground above the underground water storage tank 10. The perforated tubes 53 are laid straightly, and plurally buried in a radial shape when viewed from the above. Note that there is provided a gravel layer around the perforated tubes 53 upon burying the perforated tubes 53, so as to prevent clogging of the water-permeable holes 53a as well as to collect a larger amount of rainwater.

In the thus configured wide area water collection type of underground water storage tank 10, rainwater fallen onto the surface of the ground permeates into the underground. The rainwater permeated into the underground is purified by a natural filtration of the soil. Water permeated into the underground and filtered thereby near an applicable perforated tube 53 is conducted through the water-permeable holes 53a into the interior of the perforated tube 53, and the rainwater conducted into the perforated tube 53 is guided by it to the other end of the associated second intake pipe 51. Since the water pressures at the other ends of the second intake pipes 51 are equal to or higher than the water pressures at the one ends of the second intake pipes 51 in a state where rainwater is not stored in the underground water storage tank 10, the second non-return valves 52 allow water to flow from the other ends of the second intake pipes 51 to the one ends thereof, so that the clean rainwater collected by the perforated tubes 53 is conducted into the outer water storage compartments 29, and conducted from the outer water storage compartments 29 into the plurality of internal storage sub-tanks 11 via associated first non-return valves 31 and first intake pipes 28, respectively.

When rainwater stored in the underground water storage tank 10 reaches a predetermined level, the water pressure at the other end of each second intake pipe 51 becomes lower than the water pressure at the one end of the second intake pipe 51, so that the associated second non-return valve 52 prevents water from flowing from the one end of the second intake pipe 51 to the other end thereof. This enables the water to be conducted into and stored in the underground water storage tank 10 without the water being leaked to the exterior from the second intake pipe 51, thereby effectively storing the water within the underground water storage tank 10. Accordingly, the water within the underground water storage tank 10 never permeates into the underground and never evaporates, even when rainwater existing in the interior of the soil around the underground water storage tank 10 permeates more deeply into the underground or the rainwater evaporates due to subsequent drought.

Note that the above-mentioned embodiment has been shown for such an example that the first non-return valves 31 are provided at the other ends of the first intake pipes 28, respectively, and the second non-return valves 52 are provided at the other ends of the second intake pipes 51, respectively, it is possible that the first non-return valves 31 are provided at the one ends of the first intake pipes 28 and the second non-return valves 52 are provided at the one ends of the second intake pipes 51, respectively. However, when the second non-return valves 52 are provided at the one ends of the second intake pipes 51, respectively, the one ends of the perforated tubes 53 are required to be attached to the other ends of the second intake pipes 51, respectively.

Further, although the above-mentioned embodiments have been shown for such examples that the rigid pipes 12 are fitted on and affixed to the rod-like steel materials 23 piled underground so that the assemblies of the water-bearing materials 12 are fixed to the rod-like steel materials 23, the rod-like steel materials 23 are not necessarily piled insofar as the assemblies of the water-bearing materials 12 are stabilized.

Figure 14:
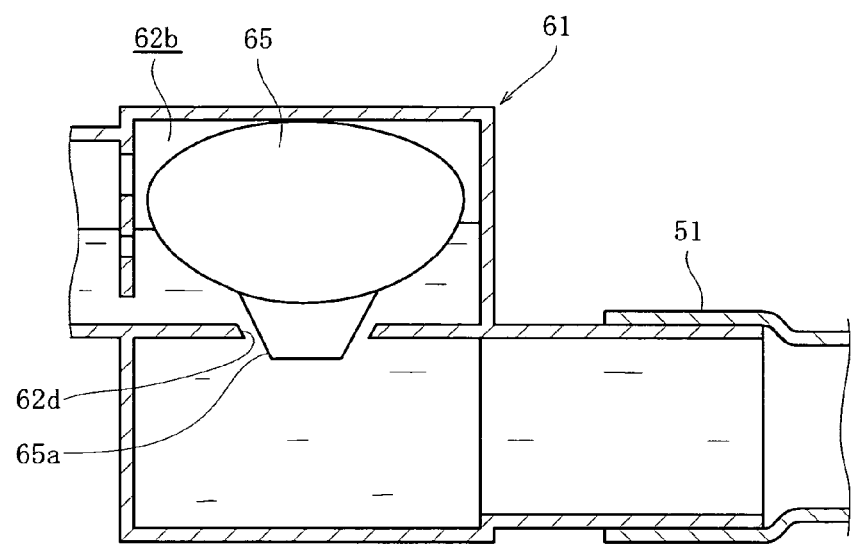
FIG. 14 A cross-sectional view of another second non-return valve having a float which sinks in water, showing a state where the second non-return valve allows for water flow.
Figure 15:
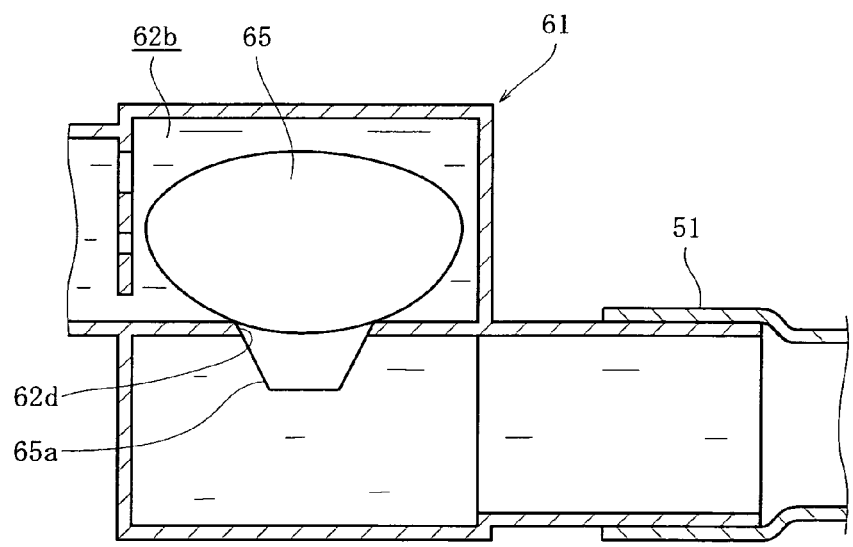
FIG. 15 A cross-sectional view of the second non-return valve showing a state where the same inhibits water flow.

Moreover, although the above-described embodiment has been described by adopting examples for the first and second non-return valves 31 and 52 having the floats 35 flowing on water, respectively, it is possible to employ such non-return valves having floats adapted to sink in water as the first and second non-return valves 31 and 52, respectively. This is particularly effective when the first non-return valve 31 is provided at one end of the associated first intake pipe 28, or the second non-return valve 52 is provided at one end of the associated second intake pipe 51. As shown in FIG. 14 and FIG. 15, there is representatively explained a situation for providing a second non-return valve 61 having a float 65 adapted to sink in water at one end of a second intake pipe 51. In case of using the float 65 adapted to sink in water as shown in FIG. 14, the float 65 is forced upward inside a first chamber 62b by a water pressure difference, when the first chamber 62b accommodating the float 65 is not filled with water or when the water pressure at the other end of the second intake pipe 51 is equal to or larger than the water pressure at the one end of the second intake pipe 51 even if the first chamber 62b is filled with water, so that a protrusion 65a of the float is departed from a circular hole 62d to allow water to flow from the other end of the second intake pipe 51 to the one end thereof. Meanwhile, as shown in FIG. 15, when the first chamber 62b accommodating the float 65 therein is filled with water and the water pressure at the other end of the second intake pipe 51 is lowered to a water pressure lower than the water pressure at the one end of the second intake pipe 51, the float 65 sinks within the first chamber 62b and the protrusion 65a thereof closes the circular hole 62d to thereby prevent water from flowing through the second intake pipe 51.

Figure 16:
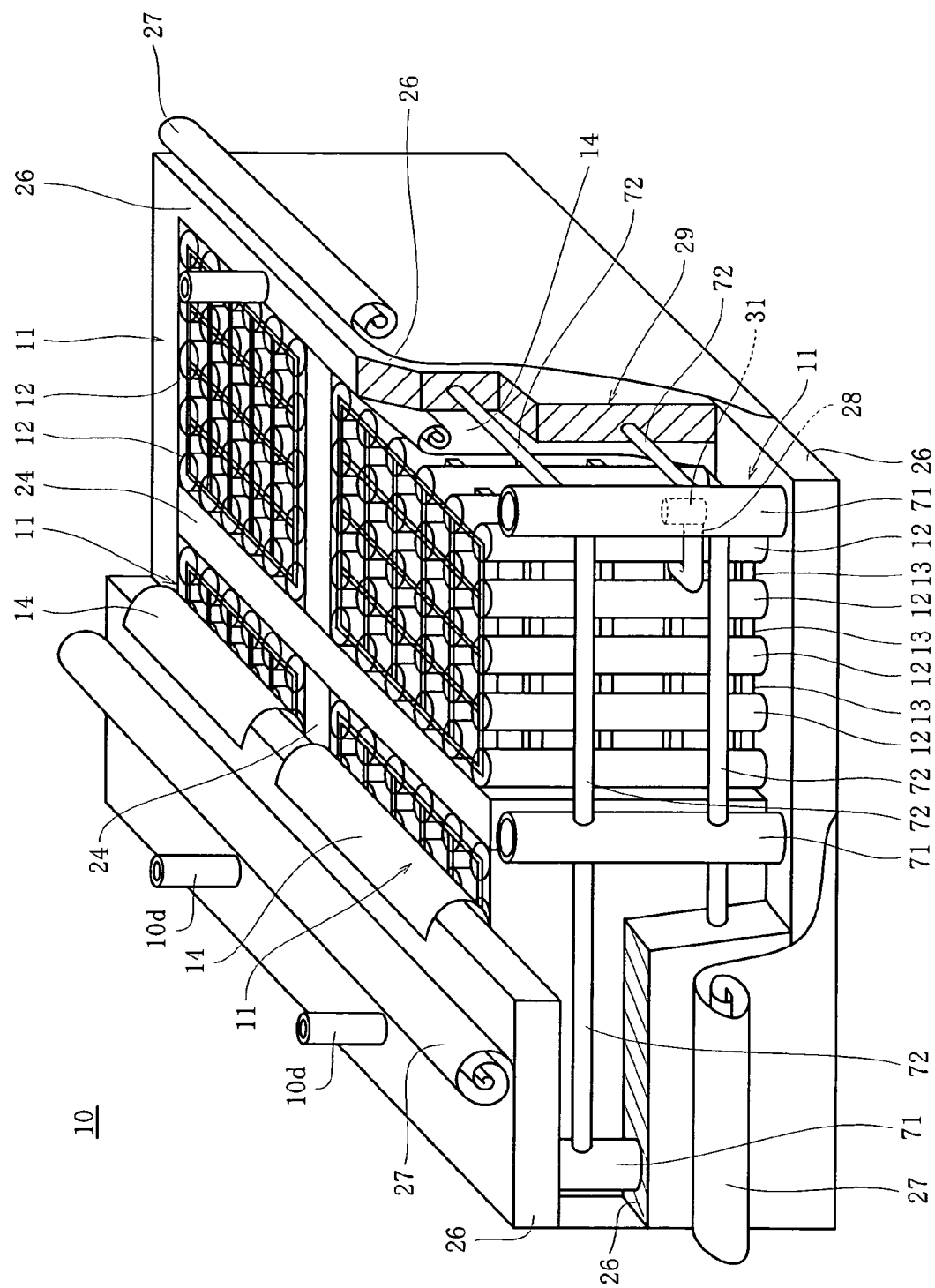
FIG. 16 A perspective view corresponding to FIG. 1, of an underground water storage tank having vertical pipes and coupling pipes embedded in soil pressure absorption plates, respectively.

Furthermore, although the above-mentioned embodiments have been shown for such examples that the soil pressure absorption plates 26 are formed with the concave grooves 26a capable of storing water therein to thereby define the outer water storage compartments 29 including the soil pressure absorption plates 26 between the first water-impermeable sheet 14 and the second water-impermeable sheet 27, it is possible to embed multiple vertical pipes 71 and coupling pipes 72 for coupling the multiple vertical pipes 71 to one another within the soil pressure absorption plates 26 as shown in FIG. 16, to thereby obtain outer water storage compartments 29 capable of storing water in the vertical pipes 71 and coupling pipes 72, respectively. In this case, it is desirable that other ends of first intake pipes 28 provided through the first water-impermeable sheet 14 are opened to the interiors of the applicable vertical pipes 71, and first non-return valves 31 are provided at other ends of the first intake pipes 28 such that the first non-return valves 31 are located within the vertical pipes 71, respectively.

Figure 17:
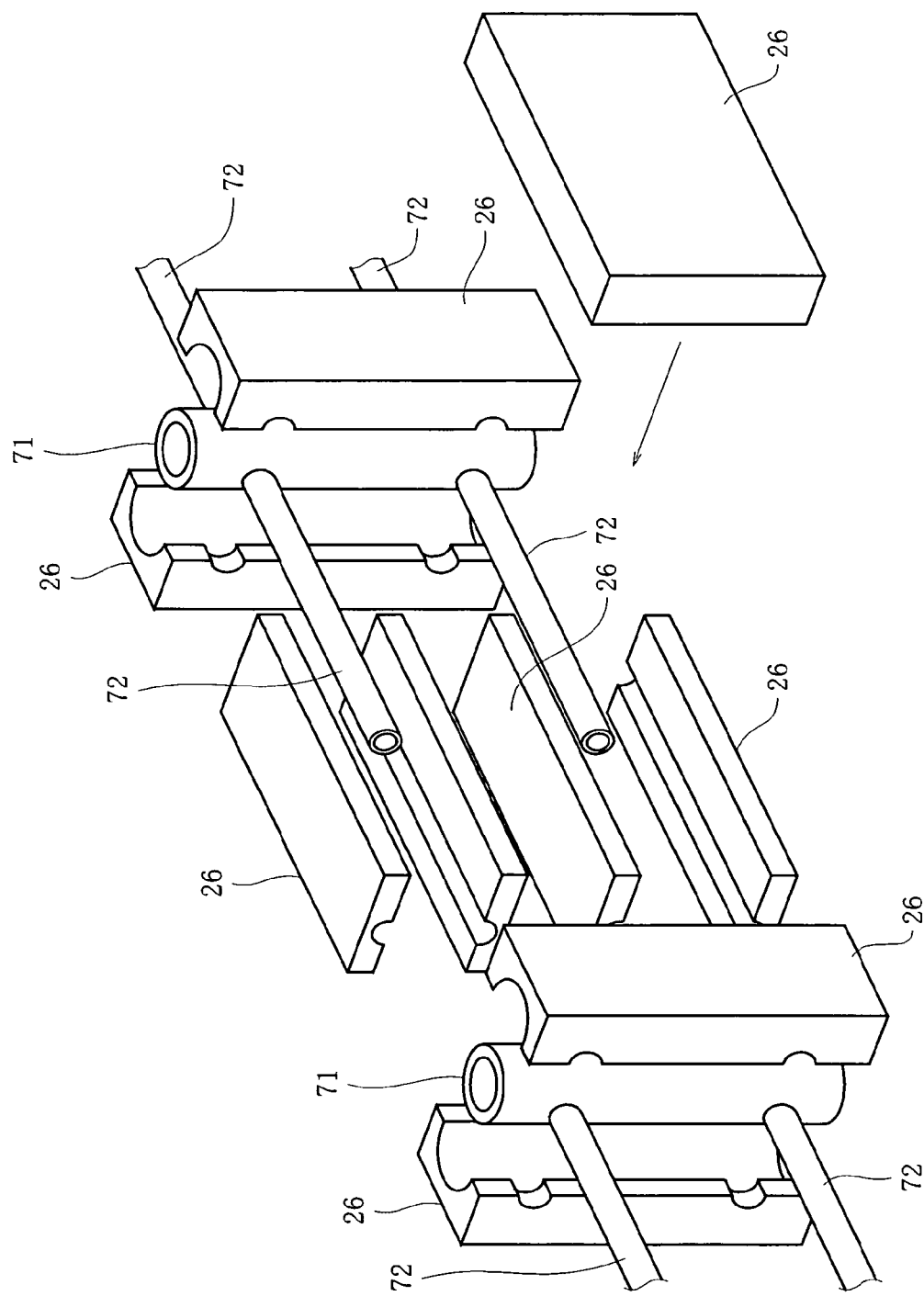
FIG. 17 A perspective view of the vertical pipes and coupling pipes showing a state where the pipes are embedded.

In case of the underground water storage tank of FIG. 16, the vertical pipes 71 and coupling pipes 72 are longitudinally and laterally assembled around the internal water storage sub-tanks 11 after forming the internal water storage sub-tanks 11, respectively. Thereafter, the other ends of the first intake pipes 28 provided through the first water-impermeable sheet 14 are opened into the interior of the applicable vertical pipes 71, respectively, and the first non-return valves 31 are provided at the other ends of the first intake pipes 28, respectively. Further, the vertical pipes 71 and coupling pipes 72, in a state that the first non-return valves 31 are present within the vertical pipes 71, are embedded in the soil pressure absorption plates 26. FIG. 17 shows a state of embedded vertical pipes 71 and coupling pipes 72 in a situation where the soil pressure absorption plates 26 are made of foamed bodies such as expanded polystyrene, expanded vinyl chloride, or the like, or extruded hollow articles. FIG. 17 shows an example for combining soil pressure absorption plates 26 in multiple shapes with one another so as to embed vertical pipes 71 and coupling pipes 72 therein, thereby providing the soil pressure absorption plates 26 outside the applicable internal water storage sub-tank 11. Returning to FIG. 16, intake pipes 10d are subsequently connected to the vertical pipes 71 or coupling pipes 72, and the soil pressure absorption plates 26 are wrapped by a continuously established second water-impermeable sheet 27 together with the multiple internal water storage sub-tanks 11, thereby obtaining the underground water storage tank 10. Such an underground water storage tank 10 is capable of assuredly storing water in the outer water storage compartments 29 by conducting water into the interiors of the vertical pipes 71 and coupling pipes 72, respectively.

There will be explained another embodiment of the present invention based on the drawings.

Figure 18:
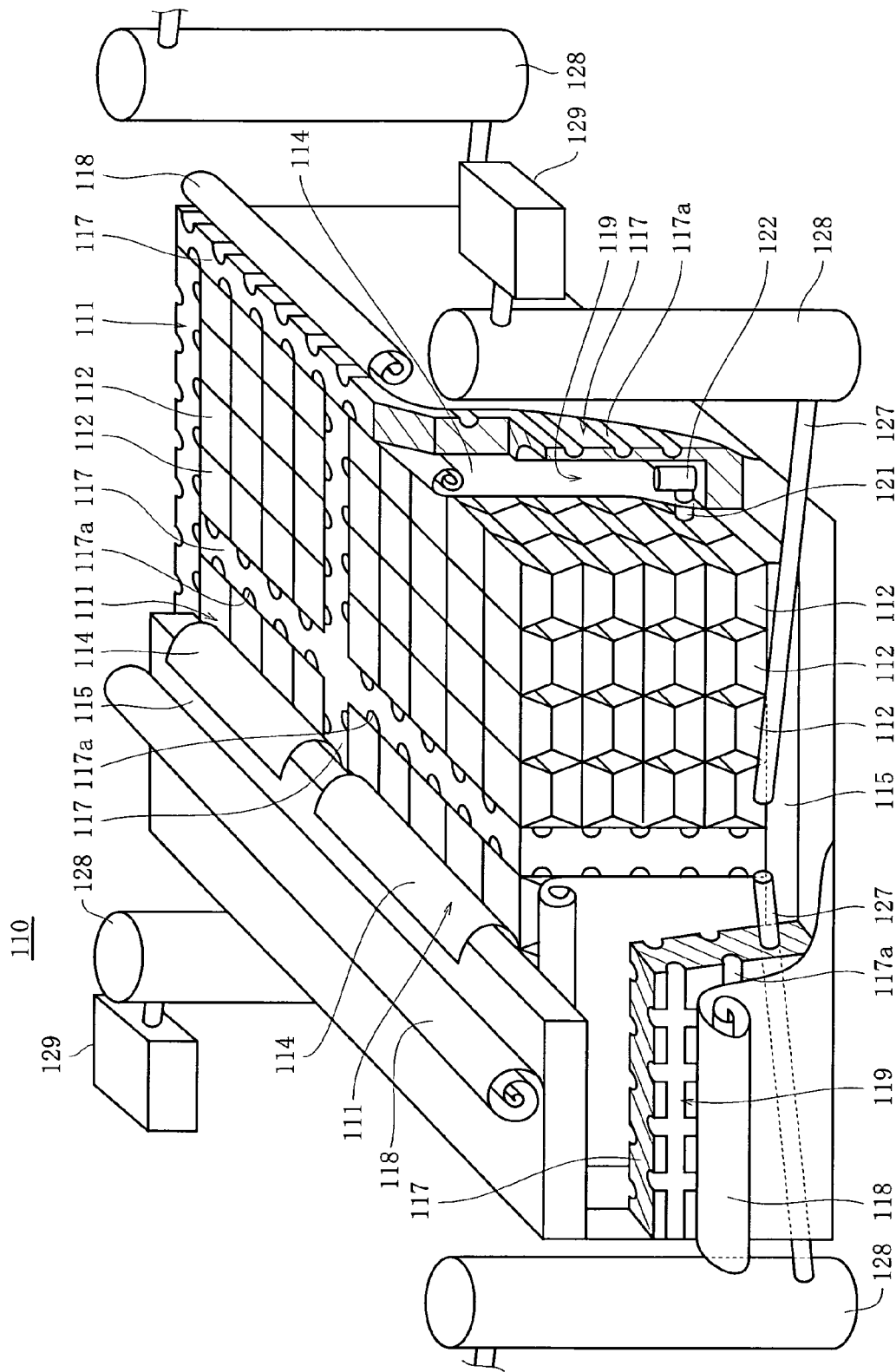
FIG. 18 A schematic perspective view of an underground water storage tank according to another embodiment of the present invention.
Figure 19:
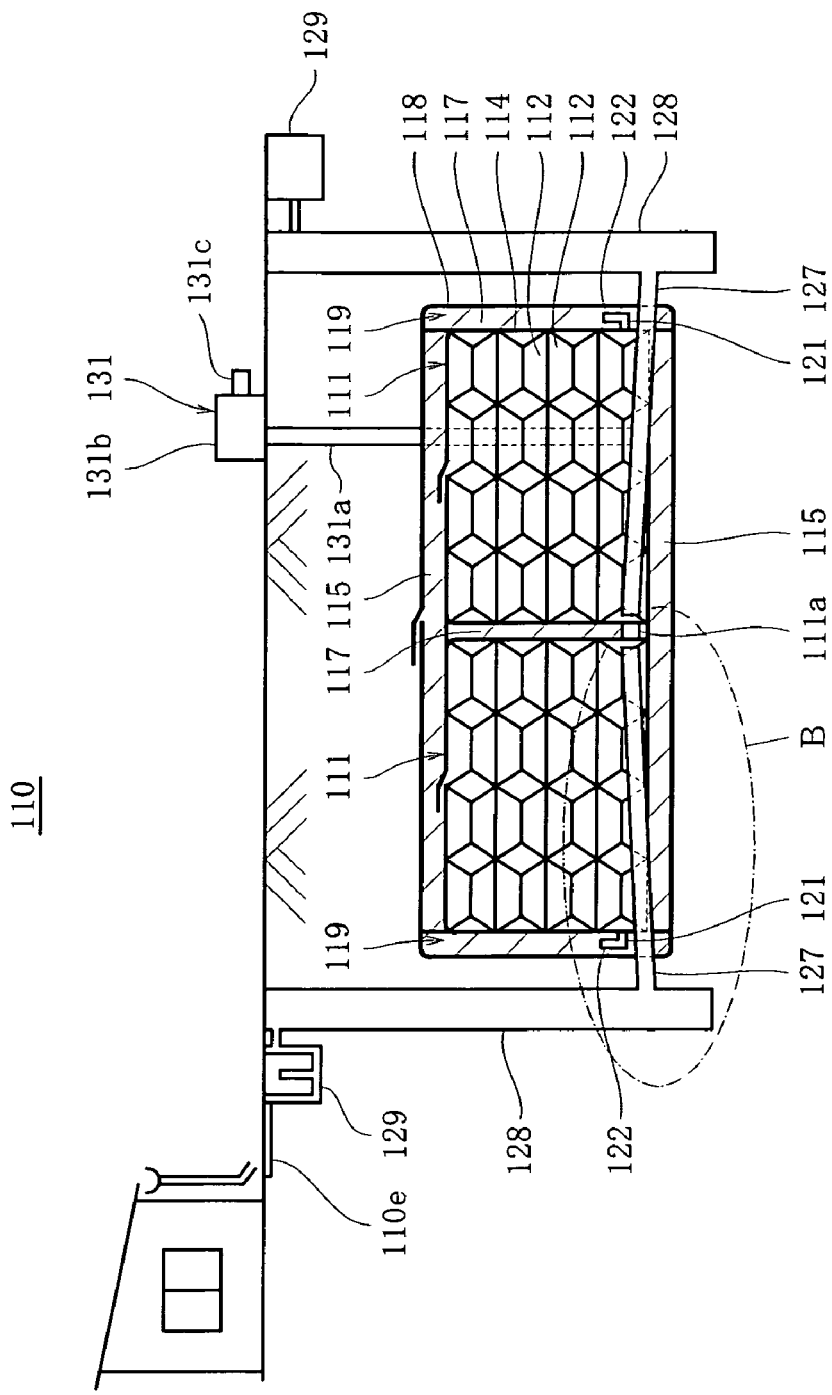
FIG. 19 A cross-sectional view of the entire configuration of the underground where the underground water storage tank is provided.

Shown in FIG. 18 and FIG. 19 is an underground water storage tank 110 of the present invention buried underground and provided with internal water storage sub-tanks 111. The internal water storage sub-tanks 111 are provided by coating assemblies obtained by combining multiple first water-bearing materials 112, by a first water-impermeable sheet 114. Used as the first water-bearing materials 112 in this embodiment are molded plastic bodies obtained by molds. The first water-bearing materials 112 comprising molded plastic bodies are each formed into a truncated quadrangular pyramid shape, and longitudinally and laterally disposed and stacked one on the other, thereby obtaining assemblies of first water-bearing materials 112. Meanwhile, the first water-impermeable sheet 114 for coating the first water-bearing materials 112 is a water-impermeable sheet made of synthetic rubber based one, synthetic resin based one, or the like, and has both surfaces typically overlapped with non-woven fabrics for protection, respectively.

The internal water storage sub-tank 111 are arranged plurally in a horizontal direction via second water-bearing materials 117, respectively, i.e., totally four including two and two internal water storage sub-tanks 111 are arranged longitudinally and laterally in FIG. 18. The internal water storage sub-tanks 111 are formed by: arranging the first water-impermeable sheet 114 onto an excavated location; longitudinally and laterally and upwardly and downwardly disposing the first water-bearing materials 112 to thereby obtain assemblies; thereafter raising the periphery of the first water-impermeable sheet 114 to surround the peripheries of the assemblies of first water-bearing materials 112 with the first water impermeable sheet 114; and further placing the end portions of the first water-impermeable sheet 114 onto a cooperative upper surface of the first water-bearing materials 112, thereby wrapping up the assemblies of the first water-bearing materials 112 by the first water-impermeable sheet 114. Here, in a case that a single water-impermeable sheet fails to have a size for wrapping the assemblies of the first water-bearing materials 112, there are prepared a plurality of such water-impermeable sheets which are then heat-welded and integrated to one another at edges thereof, respectively, to thereby obtain a first water-impermeable sheet 114 having a sufficient size for wrapping the assemblies of the first water-bearing materials 112 so that water leakage is prevented at the welded portions. Further, the internal water storage sub-tanks 111 are configured to store water in gaps among the first water-bearing materials 112, and the four internal water storage sub-tanks 111 are communicated with one another by communication pipes 111a (FIG. 19) depending on a utilization schedule of water.

The second water-bearing materials 117 are provided around the four internal water storage sub-tanks 111, respectively. Used in this embodiment are the second water-bearing materials 117 which are expanded resin plate materials having an expanded factor of 10 to 50 times, respectively, and which have surfaces each formed with a plurality of grooves 117a for water to be flowed therethrough. The four internal water storage sub-tanks 111 are upwardly and downwardly provided with soil pressure absorption plates 115, respectively; the soil pressure absorption plates 115, and the second water-bearing materials 117 provided at the peripheries of the internal water storage sub-tanks 111, are coated with a single second water-impermeable sheet 118, together with the internal water storage sub-tanks 111; and outer water storage compartments 119 are defined between the first water-impermeable sheet 114 around the internal water storage sub-tanks 111, and the second water-impermeable sheet 118. The soil pressure absorption plates 115 in this embodiment are formed of synthetic resin plates, concrete plates, slate plates, or the like which are water-resistant and pressure-resistant and have a specific gravity of about 1 to 2. Further, used as the second water-impermeable sheet 118 is the same water-impermeable sheet as the first water-impermeable sheet 114, and nonwoven fabrics for protection are overlapped on the both sides of the second water-impermeable sheet, respectively.

The first water-impermeable sheet 114 is penetratedly provided with intake pipes 121 having one ends communicated with the associated internal water storage sub-tanks 111, and other ends opened into the associated outer water storage compartments 119, respectively. The intake pipes 121 in this embodiment are provided by one or two or more in number around the associated one of the four internal water storage sub-tanks 111, respectively (FIG. 18 shows one intake pipe provided at the internal water storage sub-tank 111 at the right of the near side). The intake pipes 121 are each mounted such that the one end of the intake pipe 121 penetrates through the water-impermeable sheet 114 for the internal water storage sub-tanks 111 and is fixed to the sheet 114 by adhesion or by a combination of adhesion and a metal band thereafter so that a butt end of the one end is faced to the interior of the associated internal water storage sub-tank 111. The intake pipes 121 are each arranged near a lower end of the first water-impermeable sheet 114 forming the side portion of the associated internal water storage sub-tank 111, and each have the other end having a non-return valve 122 attached thereto.

Figure 21:
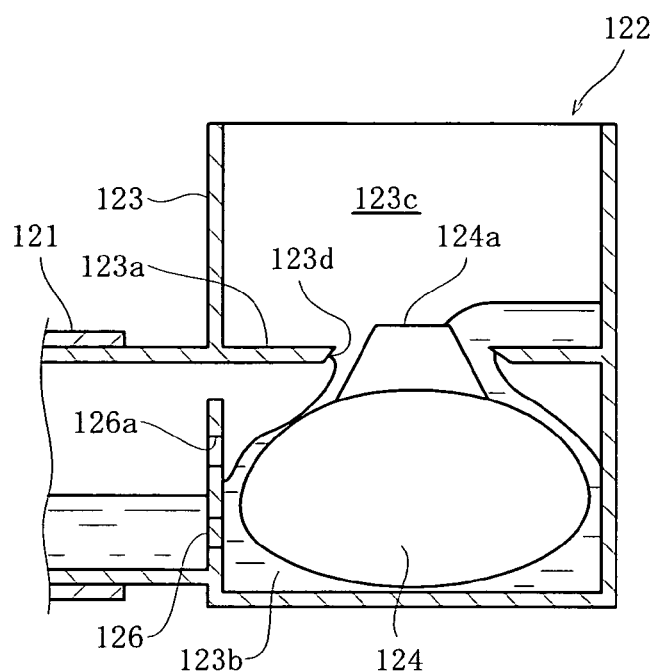
FIG. 21 A cross-sectional view of a non-return valve of the tank showing a state where the non-return valve allows for water flow.
Figure 22:
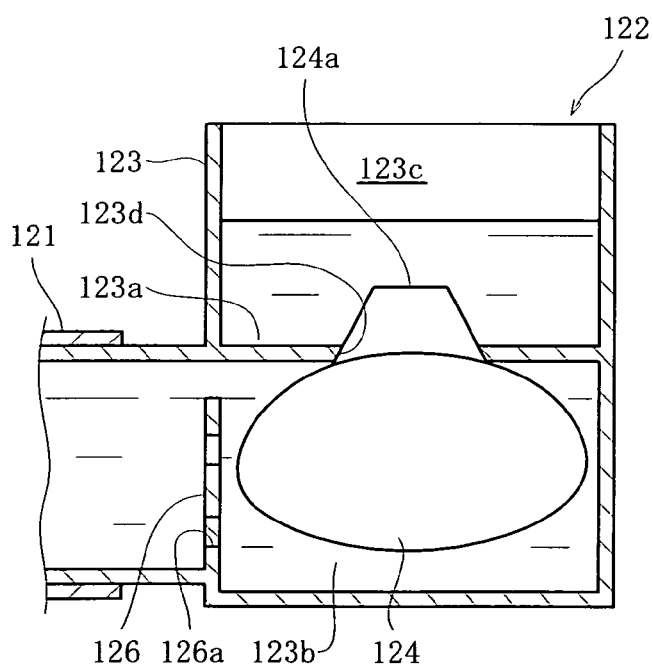
FIG. 22 A cross-sectional view of the non-return valve showing a state where the same inhibits water flow.

As shown in FIG. 21 and FIG. 22, each non-return valve 122 has: a cylindrical casing 123 having an interior divided into a first chamber 123b and a second chamber 123c by a partition wall 123a provided substantially in the center thereof; and a float 124 accommodated in the first chamber 123b. The other end of the associated intake pipe 121 is disposed at the side portion of the casing 123 in a manner to communicate with the first chamber 123b, and there is provided a wall portion 126 formed with a plurality of holes 126a enabling rainwater to flow therethrough, at a location where the other end of the intake pipe 121 is connected to the casing 123. The partition wall 123a is formed with a circular hole 123d at a central portion of the former, and the float 124 opposed to the circular hole 123d is formed with a protrusion 124a in a truncated conical shape adaptedly configured to be inserted into the circular hole 123d to thereby close it. The float 124 is configured to float on water, in such a manner shown in FIG. 21 that: the float 124 sinks within the first chamber 123b when the first chamber 123b accommodating the float 124 therein is not filled with rainwater or when the water level at the other end of the intake pipe 121 is equal to or higher than the water level at the one end of the intake pipe 121, so that the protrusion 124a of the float is departed from the circular hole 123d to thereby allow water to flow from the other end of the intake pipe 121 to the one end thereof. Meanwhile, the float 124 is configured as shown in FIG. 22 so that the float 124 floats up within the first chamber 123b when the first chamber 123b accommodating the float 124 therein is filled with water and the water level at the other end of the intake pipe 121 is lowered such that the water level at the other end of the intake pipe 121 is lower than the water level at the one end of the intake pipe 121, in a manner that the protrusion 124a of the float closes the circular hole 123d to thereby prevent water from flowing through the intake pipe 121, thereby preventing the water of the internal water storage sub-tanks 111 from flowing out into the outer water storage compartments 119.

Figure 20:
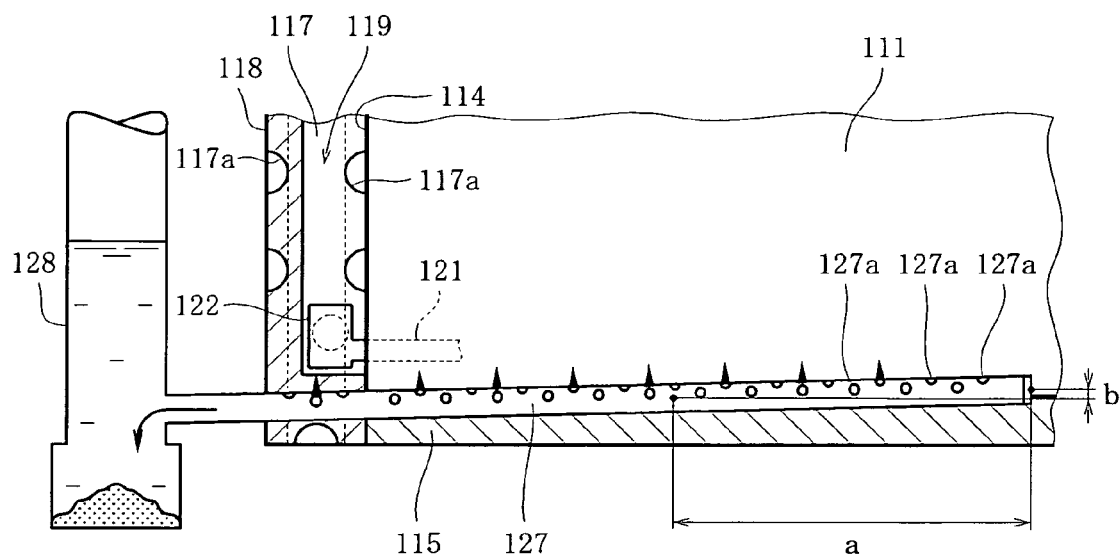
FIG. 20 An enlarged cross-sectional view of a part "B" in FIG. 19.

Returning to FIG. 18 and FIG. 19, the underground water storage tank 110 is provided with water supply pipes 127 for supplying, water flowed from the exterior of the second water-impermeable sheet 118, to the associated outer water storage compartments 119, respectively. As shown in FIG. 20, the water supply pipes 127 are perforated pipes, respectively, inclinedly provided and laterally extending at the lower portions of the outer water storage compartments 119, and each having a plurality of small holes 127a formed at the upper portion of the perforated pipe. Used as the perforated pipes 127 in this embodiment are pipes made of resin each typically having an inner diameter of 50 to 200 mm depending on the scale of the water storage tank 110, and having the small holes 127a of 10 to 30 mm in diameter plurally formed at the upper portions of the pipes, respectively, such that the formation density of the small holes 127a is about five to ten small holes 127a for a perforated pipe 127 having a length of 1 m.

The perforated pipes 127 are each inclined so that one end thereof is located lower than the other end thereof, and the one ends are connected to management liquid measures 128, respectively. The inclined angles of the perforated pipes 127 are each set so that the other end is raised by 5 cm or more in a vertical direction "b" per 1 m in a horizontal direction "a". Meanwhile, the management liquid measures 128 are provided outside the second water-impermeable sheet 118, and are configured such that water to be flowed from the exterior into the internal water storage sub-tanks 111 and stored therein, reaches the perforated pipes 127 from the management liquid measures 128, and is supplied to the outer water storage compartments 119 via multiple small holes 127a formed at the upper portions of the perforated pipes, respectively. Returning to FIG. 18 and FIG. 19, this embodiment is configured so that water to be stored in the internal water storage sub-tanks 111 is ground surface flow water, and the ground surface flow water is caused to flow into the management liquid measures 128 via grit tanks 129, respectively.

Explaining a procedure for constructing such an underground water storage tank 110, there is excavated a place where the underground water storage tank 110 is to be formed, in accordance with required depth and shape. Thereafter, the second water-impermeable sheet 118 is arranged on the excavated location. At this time, in a situation where a single water-impermeable sheet is smaller than a required area, there are prepared multiple water-impermeable sheets which are to be heat-welded to one another at edges thereof, respectively, to thereby obtain a second water-impermeable sheet 118 which has a required area and which is free of water leakage by virtue of welding or the like, and thereafter the second water-impermeable sheet 118 is arranged on the excavated location. Thereafter, soil pressure absorption plates 115 are spreadedly laid at a central portion of the second water-impermeable sheet 118 to an extent for forming the underground water storage tank 110. Further, the first water-impermeable sheet 114 is arranged on the soil pressure absorption plates 115, over an extent for forming the internal water storage sub-tanks 111. Also in this first water-impermeable sheet 114, when a single water-impermeable sheet is smaller than a required area, it is possible to prepare a plurality of water-impermeable sheets and to integrate them by heat-welding at edges thereof, to thereby obtain a first water-impermeable sheet 114 which has a required area and which is free of water leakage by virtue of welding or the like. Further, assemblies of first water-bearing materials 112 are formed on the first water-impermeable sheet 114, and the assemblies of the first water-bearing materials 112 are coated with the first water-impermeable sheet 114 to thereby form multiple internal water storage sub-tanks 111 on the soil pressure absorption plates 115. Moreover, one internal water storage sub-tank 111 is communicated with another internal water storage sub-tank 111 adjacent thereto via communication pipe 111a, and second water-bearing materials 117 are provided between the one internal water storage sub-tank 111 and the other internal water storage sub-tank 111 adjacent thereto. Then, the intake pipes 121 are provided in the first water-impermeable sheet 114 at outer peripheries of the internal water storage sub-tanks 111 in a manner to penetrate through the first water-impermeable sheet 114, and the non-return valves 122 are attached to the other ends of the intake pipes 121, respectively.

Thereafter, perforated pipes as the water supply pipes 127 are arranged at lower portions of outer peripheries of the internal water storage sub-tanks 111 along peripheral surfaces thereof, respectively. The water supply pipes 127 are each arranged so that small holes 127a thereof are generally located at an upper portion of the water supply pipe so as to locate most of the small holes along the associated internal water storage sub-tank 111 while protruding one end of the pipe beyond an end portion of the internal water storage sub-tank 111, and the one end of the water supply pipe 127 protruded beyond the end portion of the internal water storage sub-tank 111 is located below the other end of the pipe. Further, soil pressure absorption plates 115 are provided on a cooperative upper surface of the internal water storage sub-tanks 111, and second water-bearing materials 117 are provided around the entire peripheries of the internal water storage sub-tanks 111, respectively. Thereafter, the soil pressure absorption plates 115 and second water-bearing materials 117 together with the multiple internal water storage sub-tanks 111 are wrapped by the continuously established second water-impermeable sheet 118. Concretely, the periphery of the second water-impermeable sheet 118 is raised up to surround the whole of multiple internal water storage sub-tanks 111 together with the soil pressure absorption plates 115 and second water-bearing materials 117, and thereafter the end portions of the second water-impermeable sheet are placed on the cooperative upper surface of the upwardly provided soil pressure absorption plates 115 to thereby wrap around the whole of the multiple internal water storage sub-tanks 111 by the second water-impermeable sheet 118. At this time, the second water-impermeable sheet 118 is penetratedly provided with one ends of the water supply pipes 127, at locations corresponding thereto, respectively.

Management liquid measures 128 are provided outside the second water-impermeable sheet 118 wrapping around the whole of the multiple internal water storage sub-tanks 111, and one ends of the water supply pipes 127 are connected to the management liquid measures 128, respectively. Then, there is inserted a drainage pipe 131a into the internal water storage sub-tanks 111 from the above, and the lower end of the former is provided to reach an inner bottom of the associated internal water storage sub-tank 111. Thereafter, the management liquid measures 128 and drainage pipe 131a are buried back so that upper ends thereof are exposed at the surface of the ground. Grit tanks 129 are buried near upper ends of the management liquid measures 128, respectively. The grit tanks 129 are connected to rainwater collection ditches 110e or the like located at the surface of the ground, respectively. The grit tanks 129 and management liquid measures 128 are connected to each other, respectively, and configured so that rainwater collected in the rainwater collection ditches 110e or the like flows into the management liquid measures 128 via grit tanks 129.

Further, as shown in FIG. 19, provided at a position of an upper end of the drainage pipe 131a after burying back, is drainage means 131 capable of taking up the water stored in the internal water storage sub-tanks 111. The drainage means 131 is constituted of: the drainage pipe 131a having a lower end penetrating through the second water-impermeable sheet 118 and the first water-impermeable sheet 114 at the associated internal water storage sub-tank 111 to reach the bottom of the sub-tank; and a drainage pump 131b provided on the ground and capable of sucking water inside the water storage tank 110, from the upper end of the drainage pipe 131a. Further, the drainage means is configured to deliver water stored in the internal water storage sub-tanks 111 to the exterior to utilize the water, by causing the water sucked by the drainage pump 131b through the drainage pipe 131a, to be discharged from a discharge pipe 131c.

In such an underground water storage tank 110, the internal water storage sub-tanks 111 obtained by coating the first water-bearing materials 112 with the first water-impermeable sheet 114 are further coated with the second water-impermeable sheet 118, so that the soil pressures from the surroundings are applied to the second water-impermeable sheet 118 to thereby prevent direct application of the soil pressures to the first water-impermeable sheet 114, thereby allowing effective prevention of leakage of the water stored in the internal water storage sub-tanks 111 to the exterior. Particularly, since the second water-bearing materials 117 are expanded resin plate materials having surfaces formed with water flow grooves 117a, respectively, the soil pressures applied from the surroundings to the second water-impermeable sheet 118 are effectively absorbed by the second water-bearing materials 117 comprising expanded resin plate materials, thereby effectively preventing a situation that the soil pressures are applied to the first water-impermeable sheet 114 to break the internal water storage sub-tanks 111.

Further, since the second water-bearing materials 117 made of expanded resin plate materials have surfaces formed with multiple grooves 117a for water to be flowed therethrough, the water-bearing ratio taken by the outer water storage compartments 119 is one taken by the multiple grooves 117a in the second water-bearing materials 117. This enables the water-bearing ratio itself to be decreased by decreasing the number of grooves 117a or decreasing the cross-sectional areas thereof, so that the decreased water-bearing ratio allows the water level in the outer water storage compartments 119 to be rapidly raised when water flows into the outer water storage compartments 119 from the exterior, thereby enabling the water supplied to the outer water storage compartments 119 to be rapidly delivered into the internal water storage sub-tanks 111. Further, even when small holes are happened to be formed in the second water-impermeable sheet 118, water to be leaked from the holes to the exterior is limited to a small amount, insofar as the water-bearing ratio at the outer water storage compartments 119 is made small. On the other hand, in a case that the amount of water to be supplied per unit time from the water supply pipes 127 to the outer water storage compartments 119 is larger than the amount of water to be leaked from such small holes to the exterior, most of the water supplied to the outer water storage compartments 119 is conducted through the non-return valves 122 and intake pipes 121 into the internal water storage sub-tanks 111 and stored therein, thereby allowing avoidance of a situation that the function of the underground water storage tank 110 is considerably lost.

Further, adopting molded resin articles as the first water-bearing materials 112 in this embodiment enables a decreased ratio of the first water-bearing materials 112 occupying in the interior space of the internal water storage sub-tanks 111 as compared with water-bearing materials comprising sand, gravel, broken stones, or the like, thereby enabling an increased amount of rainwater to be stored. Moreover, the internal water storage sub-tanks 111 are plurally provided, thereby enabling an increased amount of rainwater to be stored in the underground water storage tank 110 while providing each internal water storage sub-tank 111 in a scale which is easily constructed without increasing it into an enormous scale. Furthermore, the multiple internal water storage sub-tanks 111 are made independent, respectively, thereby enabling inhibition of leakage of water stored in one internal water storage sub-tank 111 even when the first water-impermeable sheet 114 is broken at another internal water storage sub-tank 111, thereby enabling avoidance of such a situation that the stored water is fully leaked out.

Further, the internal water storage sub-tanks 111 are plurally provided via second water-bearing materials 117, thereby enabling avoidance of breakage of the first water-impermeable sheet 114 due to the provision of multiple sub-tanks. Here, the outer water storage compartments 119 are defined between the first water-impermeable sheet 114 and second water-impermeable sheet 118, and the intake pipes 121 having one ends communicated with the internal water storage sub-tanks 111 and other ends opened to the outer water storage compartments 119, respectively, are provided to penetrate through the first water-impermeable sheet 114 such that the other ends are provided with the non-return valves 122, respectively, thereby enabling conduction of water to the multiple outer water storage compartments 119 to thereby conduct and store the water into the internal water storage sub-tanks 111 via non-return valves 122 and intake pipes 121, respectively. Note that in case of penetratingly joining the pipes including intake pipes 121 through the water-impermeable sheets 114 and 118, it is possible to effectively prevent water leakage from the joining portions, by penetrating and bonding the pipes through and to the water-impermeable sheets 114 and 118 and tightening them from the outside thereof by metal bands or the like, respectively.

Moreover, water inflow from the exterior is supplied into the outer water storage compartments 119 via management liquid measures 128 and perforated pipes 127. Thus, even when the water includes soil, sand, and the like, such soil, sand, and the like precipitate inside the management liquid measures 128 or perforated pipes 127. This enables prevention of accumulation of soil, sand, and the like in the outer water storage compartments 119. Further, since water to be stored in the internal water storage sub-tanks 111 is ground surface flow water, it becomes possible to store a relatively large amount of water in the internal water storage sub-tanks 111 by taking rainwater fallen over a relatively wide area into the grit tanks 129. Moreover, since the grit tanks 129 and management liquid measures 128 are so configured that ground surface flow water flows into the latter via former, sand and small stones included in the ground surface flow water are allowed to precipitate in the grit tanks 129, thereby enabling only such rainwater, which is relatively clean, to be stored in the internal water storage sub-tanks 111. Here, the perforated pipes 127 each have one end which is lower than the other end connected to the associated management liquid measure 128, so that soil, sand, and the like precipitated inside the perforated pipes 127 flow along the inclination of the perforated pipes 127 after inflow of water from the exterior is stopped, and reach the management liquid measures 128 and are accumulated at the bottoms of the management liquid measures 128. Therefore, it becomes possible to remove the precipitated soil, sand, and the like by cleaning the bottoms of the management liquid measures 128 such as by means for sucking them, thereby enabling achievement of suitable management of the underground water storage tank 110.

Note that although the above-mentioned embodiment has been described for a situation that the lower portion of one internal water storage sub-tank 111 is coupled to the lower portions of other internal water storage sub-tanks 111 adjacent thereto via communication pipes 111a, respectively, it is possible to make the internal water storage sub-tanks 111 independent and to provide drainage pipes 131a for the internal water storage sub-tanks 111, respectively, in a manner that the drainage pipes each penetrate through the first water-impermeable sheet 114. In this way, when the multiple internal water storage sub-tanks 111 are made independent, it becomes possible to inhibit leakage of water stored in one internal water storage sub-tank 111 even when the first water-impermeable sheet 114 is broken at another internal water storage sub-tank 111, thereby enabling avoidance of such a situation that the stored water is fully leaked out.

Further, although the above-mentioned embodiment has been shown for such an example that the non-return valves 122 are provided at the other ends of the intake pipes 121, respectively, it is possible to provide the non-return valves 122 at one ends of the intake pipes 121, respectively.

Figure 23:
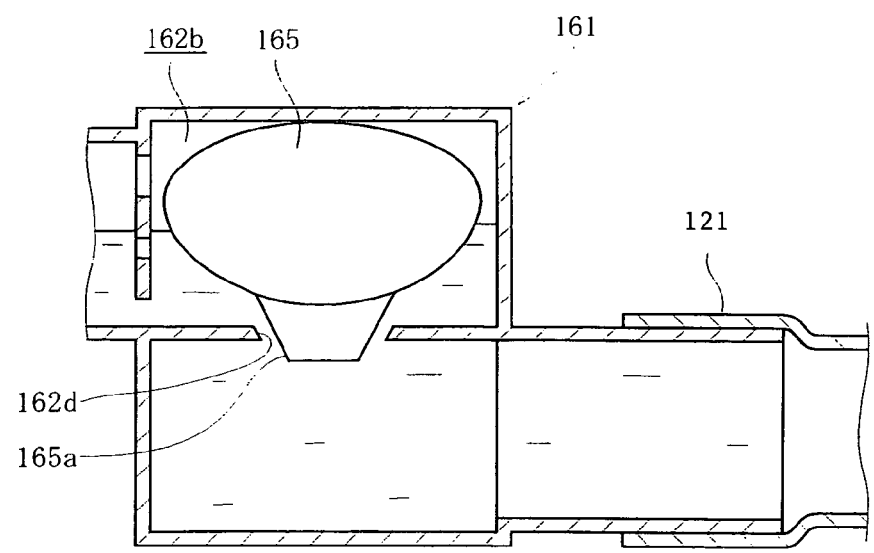
FIG. 23 A cross-sectional view of another non-return valve having a float which sinks in water, showing a state where the non-return valve allows for water flow.
Figure 24:
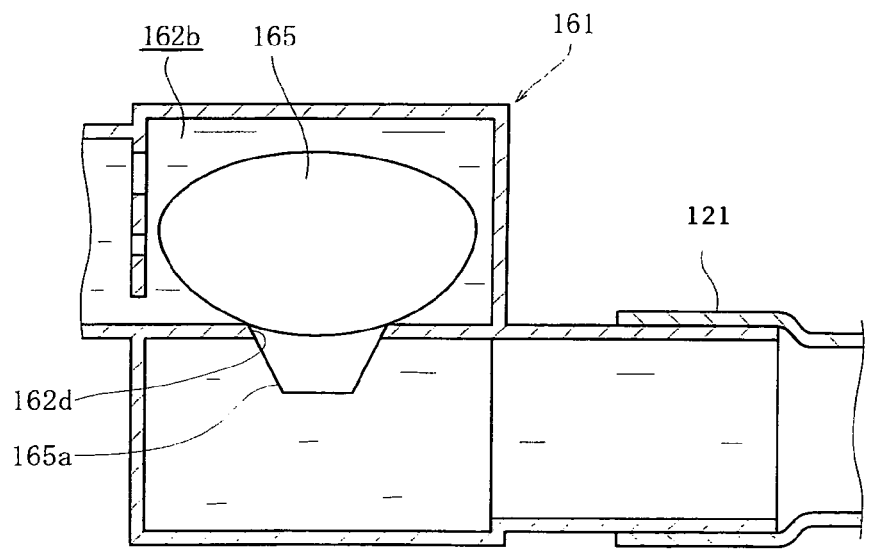
FIG. 24 A cross-sectional view of the non-return valve showing a state where the same inhibits water flow.

Moreover, although the above-mentioned embodiment has been described by adopting an example for the non-return valves 122 each having the float 124 flowing on water, it is possible to employ such non-return valves having floats adapted to sink in water as the non-return valves 122, respectively. This is particularly effective when non-return valves 122 are provided at one ends of the intake pipes 121, respectively. As shown in FIG. 23 and FIG. 24, there is representatively explained a situation for providing a float 165 adapted to sink in water. In case of using the float 165 adapted to sink in water as shown in FIG. 23, the float 165 is forced upward inside a first chamber 162b by a water level difference, when the first chamber 162b accommodating the float 165 is not filled with water or when the water level at the other end of the second intake pipe 121 is equal to or larger than the water level at the one end of the second intake pipe 121 even if the first chamber 162b is filled with water, so that a protrusion 165a of the float is departed from a circular hole 162d to allow water to flow from the other end of the second intake pipe 121 to the one end thereof. Meanwhile, as shown in FIG. 24, when the first chamber 162b accommodating the float 165 therein is filled with water and the water level at the other end of the second intake pipe 121 is lowered to a water pressure lower than the water pressure at the one end of the second intake pipe 121, the float 165 sinks within the first chamber 162b and the protrusion 165a thereof closes the circular hole 162d to thereby prevent water from flowing through the second intake pipe 121.

Although the above-described embodiment has been described by exemplarily adopting the second water-bearing materials 117 made of expanded resin materials and having surfaces formed with the multiple grooves 117a for water to be flowed therethrough, the second water-bearing materials 117 may be sand, gravel, broken stones, or the like, and alternatively, rounded glass beads, resin pellets, or even rod-like materials, pipes or the like made of resin, insofar as the same can bear water flowed thereinto from the water supply pipes 127.

Figure 25:
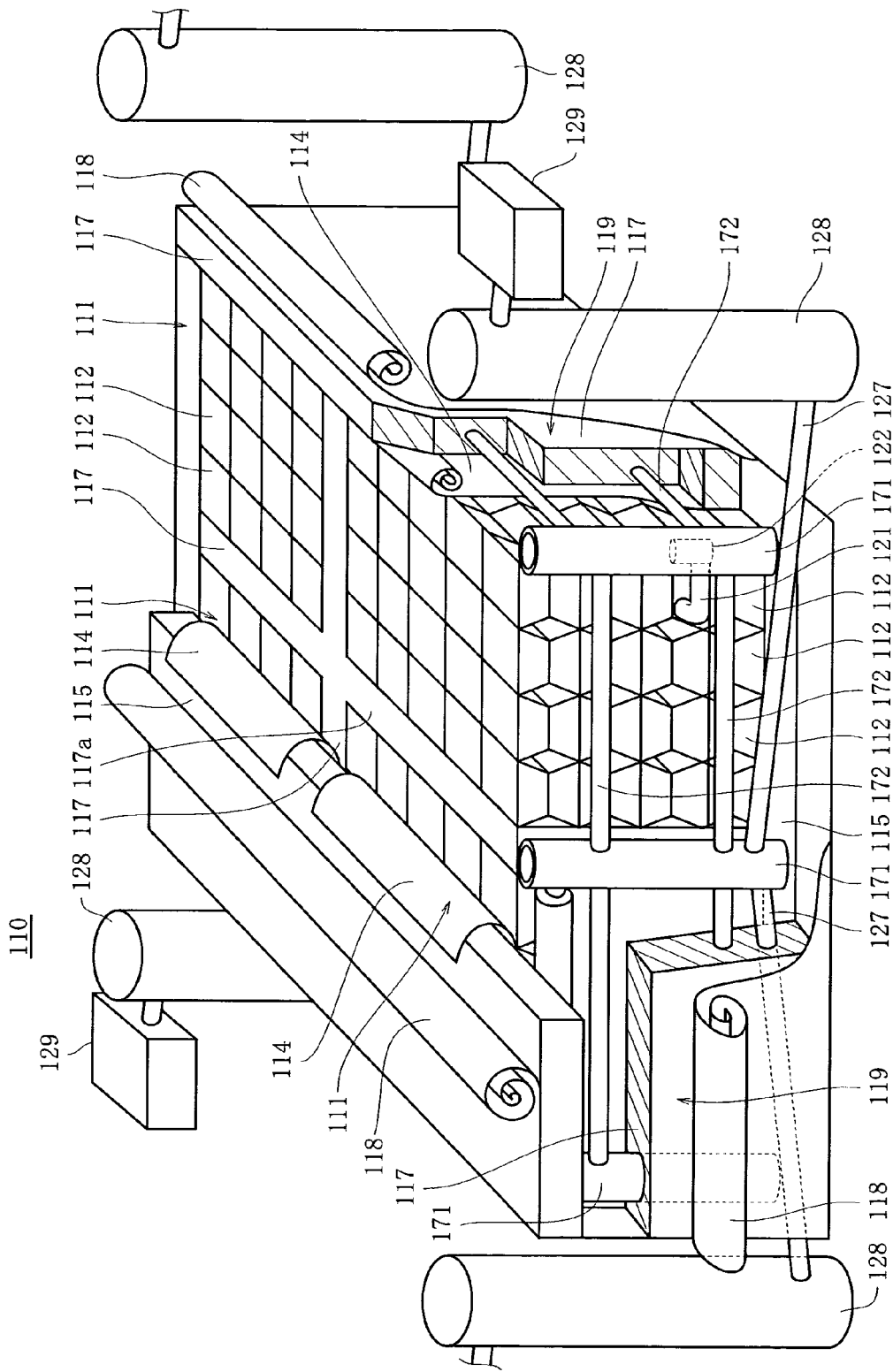
FIG. 25 A perspective view corresponding to FIG. 18, of an underground water storage tank having vertical pipes and coupling pipes embedded in second water-bearing materials, respectively.

Further, although the above-mentioned embodiment has been shown for such an example adopting the second water-bearing materials 117 having surfaces formed with the multiple grooves 117*a* for water to be flowed therethrough, it is possible to embed multiple vertical pipes 171 and coupling pipes 172 for coupling the multiple vertical pipes 171 to one another within the second water-bearing materials 117 as shown in FIG. 25, to thereby store water in the multiple vertical pipes 171 and coupling pipes 172. In this case, it is desirable that the other ends of the water supply pipes 127 having one ends connected to the management liquid measures 128, respectively, are connected to the applicable vertical pipes 171, and the other ends of the intake pipes 121 provided through the first water-impermeable sheet 114 are opened into the interiors of the applicable vertical pipes 171, respectively, so that the non-return valves 122 are provided at the other ends of the intake pipes 121, respectively, and the non-return valves 122 are located within the vertical pipes 171, respectively.

In case of the underground water storage tank of FIG. 25, the other ends of the water supply pipes 127 are connected to the applicable vertical pipes 171, respectively, thereby eliminating the necessity of adoption of the above-described perforated pipes as the water supply pipes 127. Further, water supplied from the exterior is conducted into the vertical pipes 171 constituting the outer water storage compartments 119 via management liquid measure 128 and water supply pipes 127, and flows into the internal water storage sub-tanks 111 via non-return valves 122 and intake pipes 121 from the vertical pipes 171, thereby enabling the water, which has been supplied from the exterior, and in which soil, sand, and the like have been precipitated, to be effectively stored within the internal water storage sub-tanks 111.

INDUSTRIAL APPLICABILITY

It becomes possible to provide an underground water storage tank, by which water leakage is rarely caused, which is capable of remarkably increasing an amount of water to be stored therein, and which is capable of storing relatively clean water therein.

The invention claimed is:

1. An underground water storage tank configured to be buried underground and to be capable of storing water therein, characterized in that said underground water storage tank comprises:
    an internal water storage sub-tank provided by coating an assembly of water-bearing materials obtained by combining multiple water-bearing materials with one another with a first water-impermeable sheet;
    soil pressure absorption plates for absorbing soil pressure from the surroundings of the underground water storage tank provided outside said internal water storage sub-tank; and
    a second water-impermeable sheet for coating said soil pressure absorption plates so as to prevent water stored in the internal water storage sub-tank leaking to the exterior, and wherein an outer water storage compartment including said soil pressure absorption plates is defined between said first water-impermeable sheet and said second water-impermeable sheet;
    multiple vertical pipes, and coupling pipes for coupling said vertical pipes to one another,
    wherein one or more first intake pipes, each having one end communicated to said internal water storage sub-tank and the other end opened into said outer water storage compartment, are provided to penetrate through said first water-impermeable sheet;
    said first intake pipe is provided with a first non-return valve configured to allow water to flow from said outer water storage compartment into the interior of each internal water storage sub-tank when a water pressure of said outer water storage compartment is equal to or higher than a water pressure within the internal water storage sub-tank; and prevent water from flowing from the interior of the internal water storage sub-tank to said outer water storage compartment when a water pressure of said outer water storage compartment is below a water pressure within the or each internal water storage sub-tank, and wherein
    said vertical pipes and said coupling pipes are embedded in said soil pressure absorption plates; wherein said first intake pipe is provided through said first water-impermeable sheet so that the other end of said first intake pipe is opened into the interior of an applicable one of said vertical pipes; and wherein said first non-return valve is provided at the other end of said first intake pipe inside said applicable vertical pipe.

2. The underground water storage tank of claim 1 further comprising:
    one or more second intake pipes each having one end set to penetrate through said second water-impermeable sheet and communicated with said outer water storage compartment, and the other end opened underground around the outer periphery of said second water-impermeable sheet;
    a second non-return valve provided at one end or other end of said second intake pipe, and configured to: allow water to flow from the other end of said second intake pipe to one end thereof, when a water pressure at the other end of said second intake pipe is equal to or higher than a water pressure at the one end of said second intake pipe; and prevent water from flowing from the one end of said second intake pipe to the other end thereof, when a water pressure at the other end of said second intake pipe is below a water pressure at the one end of the or each second intake pipe; and
    a perforated tube formed with a plurality of water-permeable holes over a periphery thereof, and buried in a manner to have one end connected to the other end said each second intake pipe or to said second non-return valve, and the other end to be located above said second non-return valve.

3. An underground water storage tank configured to be buried underground and to be capable of storing water therein, characterized in that said underground water storage tank comprises:
    an internal water storage sub-tank comprising first water-bearing materials coated with a first water-impermeable sheet; an outer water storage compartment defined between said first water-impermeable sheet provided around said internal water storage sub-tank and a second water-impermeable sheet, and provided by coating second water-bearing materials disposed around said internal water storage sub-tank with said second water-impermeable sheet;
    one or two or more intake pipes each provided to penetrate through said first water-impermeable sheet and to have one end communicated to said internal water storage sub-tank-and the other end opened into said outer water storage compartment;

a non-return valve provided at said intake pipe and configured to: allow water to flow from said outer water storage compartment into the interior of said internal water storage sub-tank, when a water level of the outer water storage compartment is equal to or higher than a water level inside said internal water storage sub-tank; and prevent water from flowing from the interior of said internal water storage sub-tank into said outer water storage compartment, when a water level of said outer water storage compartment is below a water level inside said internal water storage sub-tank; and a water supply pipe for supplying said outer water storage compartment with water which is to be stored into said internal water storage sub-tank through said non-return valve-and intake pipe-, wherein said water supply pipe is provided at a lower portion of said outer water storage compartment so that the one end of said water supply pipes is located lower than the other end thereof;

wherein the one end of said water supply pipe is connected to a management liquid measure provided outside said second water-impermeable sheet; and wherein said management liquid measure is configured so that water supplied to said management liquid measure is supplied into said outer water storage compartment from said management liquid measure through said water supply pipe.

4. The underground water storage tank of claim 3, wherein said internal water storage sub-tank comprises multiple internal water storage sub-tanks arranged in a horizontal direction with second water-bearing materials interposed therebetween; and
   wherein said second water-impermeable sheet-is continuously established to coat said multiple internal water storage sub-tanks.

5. The underground water storage tank of claim 3, wherein said second water-bearing materials each comprises an expanded resin plate material having a surface formed with a plurality of water flow grooves.

6. The underground water storage tank of claim 3, further comprising multiple vertical pipes, and coupling pipes for coupling said vertical pipes to one another, said vertical pipes and coupling pipes being embedded in said second water-bearing materials;
   wherein the other end of said water supply pipe-is connected to applicable one of said vertical pipes;
   wherein said intake pipe is provided at said first water-impermeable sheet such that the other end of said intake pipe is opened into the interior of applicable one of said vertical pipes; and
   wherein said non-return valve is provided at the other end of said intake pipe inside said applicable vertical pipe.

* * * * *